US012736777B2

(12) United States Patent
Sun et al.

(10) Patent No.: US 12,736,777 B2
(45) Date of Patent: Sep. 15, 2026

(54) METHODS OF MAKING A LOW-COST MINIATURE ACCOMMODATING OPTICAL IMAGING SYSTEM

(71) Applicant: Northwestern University, Evanston, IL (US)

(72) Inventors: Cheng Sun, Evanston, IL (US); Rihan Hai, Evanston, IL (US); Henry Oliver Tenadooah Ware, Evanston, IL (US); Evan Hunter Jones, Evanston, IL (US)

(73) Assignee: Northwestern University, Evanston, IL (US)

( * ) Notice: Subject to any disclaimer, the term of this patent is extended or adjusted under 35 U.S.C. 154(b) by 145 days.

(21) Appl. No.: 18/367,349

(22) Filed: Sep. 12, 2023

(65) Prior Publication Data

US 2024/0085670 A1 Mar. 14, 2024

Related U.S. Application Data

(60) Provisional application No. 63/405,937, filed on Sep. 13, 2022.

(51) Int. Cl.

| | |
|---|---|
| ***G02B 13/00*** | (2006.01) |
| ***B29D 11/00*** | (2006.01) |
| ***G02B 7/00*** | (2021.01) |
| ***G02B 7/02*** | (2021.01) |

(52) U.S. Cl.

CPC ........... *G02B 13/001* (2013.01); *G02B 7/003* (2013.01); *G02B 7/006* (2013.01); *G02B 7/022* (2013.01); *G02B 7/026* (2013.01); *B29D 11/00* (2013.01)

(58) Field of Classification Search

CPC ...... G02B 13/001; G02B 7/003; G02B 7/006; G02B 7/022; G02B 7/026; B29D 11/00; B29D 11/00365; B29D 11/00432

See application file for complete search history.

(56) References Cited

U.S. PATENT DOCUMENTS

| | | | | |
|---|---|---|---|---|
| 10,830,639 | B2 | 11/2020 | Urban et al. | |
| 11,237,361 | B2 * | 2/2022 | Chou | G02B 7/003 |
| 11,635,607 | B2 | 4/2023 | Song et al. | |

(Continued)

OTHER PUBLICATIONS

Aharoni et al. (2019) "Circuit investigations with open-source miniaturized microscopes: past, present and future," Frontiers in cellular neuroscience 13, 141.

(Continued)

*Primary Examiner* — Twyler L Haskins
*Assistant Examiner* — John H Morehead, III
(74) *Attorney, Agent, or Firm* — Leydig, Voit & Mayer, Ltd.

(57) ABSTRACT

Provided herein are methods of making imaging systems. In one aspect, the method may comprise providing a lens; providing an optomechanical assembly; providing an imaging sensor; and operably connecting the optomechanical assembly with said lens and said imaging sensor, forming said imaging system. In some aspects, providing an optomechanical assembly may comprise manufacturing a component of the optomechanical assembly using additive manufacturing. In some aspects, providing an optomechanical assembly may comprise manufacturing a component of the optomechanical assembly using micro-continuous liquid interface production (μCLIP) 3D printing.

23 Claims, 27 Drawing Sheets

(56) References Cited

U.S. PATENT DOCUMENTS

| | | | | |
|---|---|---|---|---|
| 2014/0360273 | A1 | 12/2014 | Zhang et al. | |
| 2015/0362828 | A1* | 12/2015 | Patel | A61B 1/0661 348/75 |
| 2016/0070006 | A1* | 3/2016 | Konkle | H04N 23/30 250/366 |
| 2016/0370556 | A1* | 12/2016 | Ito | G02B 7/022 |
| 2017/0064229 | A1* | 3/2017 | Wable | H10P 74/23 |
| 2018/0000158 | A1 | 1/2018 | Ewing et al. | |
| 2018/0088048 | A1 | 3/2018 | Dong et al. | |
| 2018/0186082 | A1* | 7/2018 | Randhawa | B33Y 50/02 |
| 2018/0272614 | A1* | 9/2018 | Hanano | B29C 64/393 |
| 2019/0025476 | A1 | 1/2019 | Sun et al. | |
| 2020/0200953 | A1* | 6/2020 | Hanano | B33Y 80/00 |
| 2020/0319424 | A1* | 10/2020 | Feng | G02B 7/021 |
| 2021/0016496 | A1 | 1/2021 | Chen et al. | |
| 2022/0035228 | A1* | 2/2022 | McAllister | G03B 21/147 |
| 2022/0107483 | A1* | 4/2022 | Chou | G02B 7/003 |

OTHER PUBLICATIONS

Assefa et al. (2019) "Imaging-quality 3D-printed centimeter-scale lens," Optics express 27, 12630-12637.

August et al. (2016) "Miniature compressive ultra-spectral imaging system utilizing a single liquid crystal phase retarder," Scientific reports 6, 1-9, 23524.

Bagheri et al. (2019) "Photopolymerization in 3D Printing," ACS Appl. Polym. Mater. 1, 593-611.

Biehl et al. (1998) "Refractive microlens fabrication by ink-jet process," Journal of Sol-Gel Science and Technology 13, 177-182, doi:10.1023/a:1008648615758.

Chen et al. (2018) "High-Speed 3D Printing of Millimeter-Size Customized Aspheric Imaging Lenses with Sub 7 nm Surface Roughness," Adv Mater 30, e1705683, doi:10.1002/adma.201705683.

Collins et al. (2020) "Robotic microscopy for everyone: the OpenFlexure microscope," Biomedical Optics Express 11, 2447-2460.

Cruz et al. (2017) "Ceramic 3D printing—The future of brick architecture," presented at Proc. IASS Annual Symp. Hamburg, Germany, Sep. 2017.

Cybulski et al. (2014) "Foldscope: origami-based paper microscope," PloS one 9, e98781.

Dehoff et al. (2013) "Case study: additive manufacturing of aerospace brackets," Advanced Materials & Processes 171, 19-23.

Duda et al. (2016) "3D Metal Printing Technology," Ifac Papersonline 49, 103-110, doi:10.1016/j.ifacol.2016.11.111.

Dylla-Spears et al. (2020) "3D printed gradient index glass optics," Science advances 6, eabc7429 (2020).

Gawedzinski et al. (2017) "Quantitative evaluation of performance of three-dimensional printed lenses," Optical engineering 56, 084110.

Gissibl et al. (Jun. 24, 2016) "Sub-micrometre accurate free-form optics by three-dimensional printing on single-mode fibres," Nat Commun 7, 11763, doi:10.1038/ncomms11763.

Gissibl et al. (Jun. 27, 2016) "Two-photon direct laser writing of ultracompact multi-lens objectives," Nature Photonics 10, 554-560, doi:10.1038/nphoton.2016.121.

Gong et al. (2017) "Custom 3D printer and resin for 18 μm x 20 μm mi-croflfluidic flow channels," Lab Chip, DOI: 10.1039/C7LC00644F.

Hai et al. (Jan. 2023) "3D Printing a Low-Cost Miniature Accommodating Optical Microscope," Adv. Mater. 35, 2208365.

Ichida (2016) "Current Status of 3D Printer Use among Automotive Suppliers: Can 3D Printed-parts Replace Cast Parts," IFEAMA SPSCP 5, 69-82.

Kawata et al. (2001) "Finer features for functional microdevices—Micromachines can be created with higher resolution using two-photon absorption," Nature 412, 697-698, doi:Doi 10.1038/35089130.

Kobryn et al. (2006) "Additive manufacturing of aerospace alloys for aircraft structures," Air Force Research Lab Wright-Patterson AFB OH Materials and Manufacturing.

Lecklider (2017) "3D printing drives automotive innovation," EE-Evaluation Engineering 56, 16-20.

Li et al. (Apr. 2022) "3D-Printed Micro Lens-in-Lens for In Vivo Multimodal Microendoscopy," Small, 18, 2107032.

Macdonald et al. (2016) "Multiprocess 3D printing for increasing component functionality," Science 353, aaf2093.

Martin et al. (2017) "3D printing of high-strength aluminium alloys," Nature 549, 365-369, doi:10.1038/nature23894.

Popov et al. (2018) "Design and 3D-printing of titanium bone implants: brief review of approach and clinical cases," Biomedical engineering letters 8, 337-344.

Robertson et al. (2011) "A Simplified Force Equation for Coaxial Cylindrical Magnets and Thin Coils," IEEE Transactions on Magnetics 47, 2045-2049, doi:10.1109/TMAG.2011.2129524.

Robertson et al. (2012) "Axial Force Between a Thick Coil and a Cylindrical Permanent Magnet: Optimizing the Geometry of an Electromagnetic Actuator," IEEE Transactions on Magnetics 48, 2479-2487, doi:10.1109/tmag.2012.2194789.

Shao et al. (2019) "3D Printing Customized Optical Lens in Minutes," Advanced Optical Materials 8, 1901646, doi:10.1002/adom.201901646.

Shapiro et al. (2016) "Additive manufacturing for aerospace flight applications," Journal of Spacecraft and Rockets, 952-959.

Sigal et al. (2016) "Imaging brain activity during seizures in freely behaving rats using a miniature multi-modal imaging system," Biomedical Optics Express 7, 3596-3609.

Tetsuka et al. (2020) "Materials and technical innovations in 3D printing in biomedical applications," Journal of Materials Chemistry B 8, 2930-2950.

Toombs et al. (Apr. 2022) "Volumetric additive manufacturing of silica glass with microscale computed axial lithography," Science 376, 308-312.

Toulouse et al. (Jan. 2022) "Ultra-compact 3D-printed wide-angle cameras realized by multi-aperture freeform optical design," Optics Express 30, 707-720.

Tsai (2010) "Effect of injection molding process parameters on optical properties of lenses," Applied Optics 49, 6149-6159.

Tumbleston et al. (2015) "Additive manufacturing. Continuous liquid interface production of 3D objects," Science 347, 1349-1352, doi:10.1126/science.aaa2397.

Van Lith et al. (2016) "3D-Printing Strong High-Resolution Antioxidant Bioresorbable Vascular Stents," Advanced Materials Technologies 1, 1600138, doi:10.1002/admt.201600138.

Wang et al. (2014) "Analysis of optical properties in injection-molded and compression-molded optical lenses," Applied optics 53, 2523-2531.

Yang et al. (2018) "Additive manufacturing-enabled part count reduction: a lifecycle perspective," Journal of mechanical design, 140, 031702.

Yu et al. (2020) "Photopolymerizable biomaterials and light-based 3D printing strategies for biomedical applications," Chemical reviews 120, 10695-10743.

Zhang et al. (2017) "Precision glass molding: Toward an optimal fabrication of optical lenses," Frontiers of Mechanical Engineering 12, 3-17.

Zhang et al. (Jan. 2022) "Suppressing the Step Effect of 3D Printing for Constructing Contact Lenses," Advanced Materials 34, 2107249.

* cited by examiner

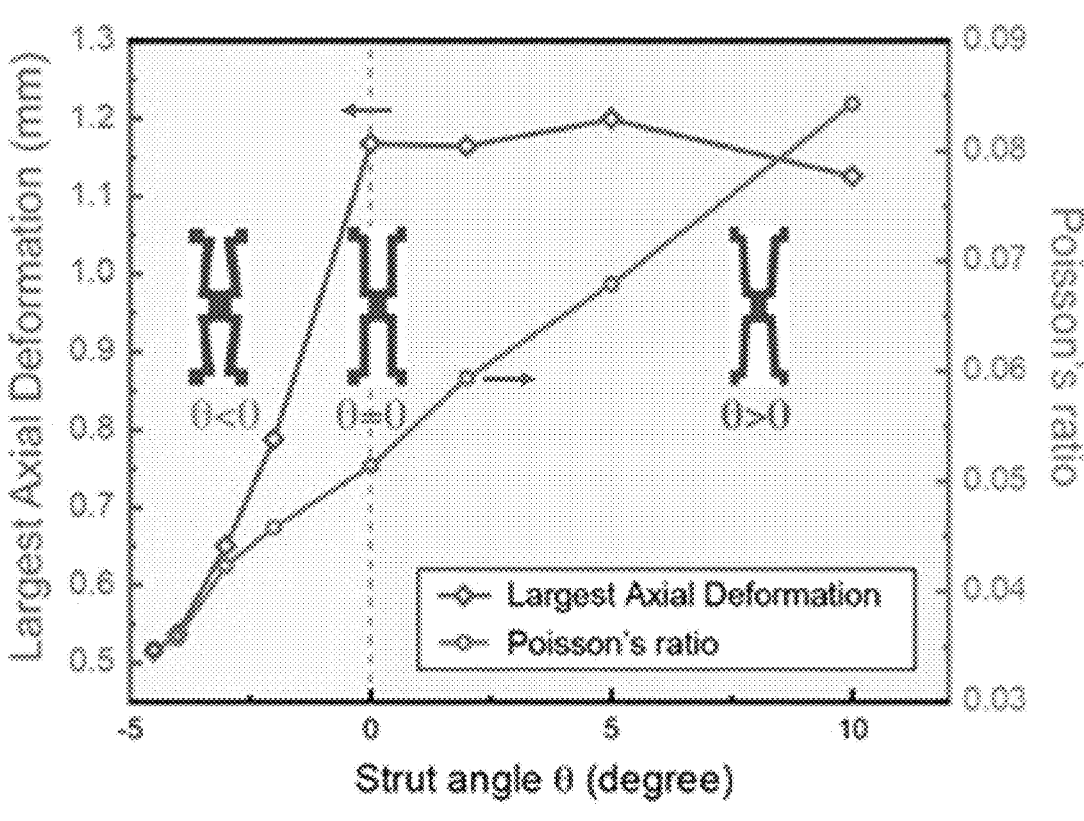
FIG. 3C
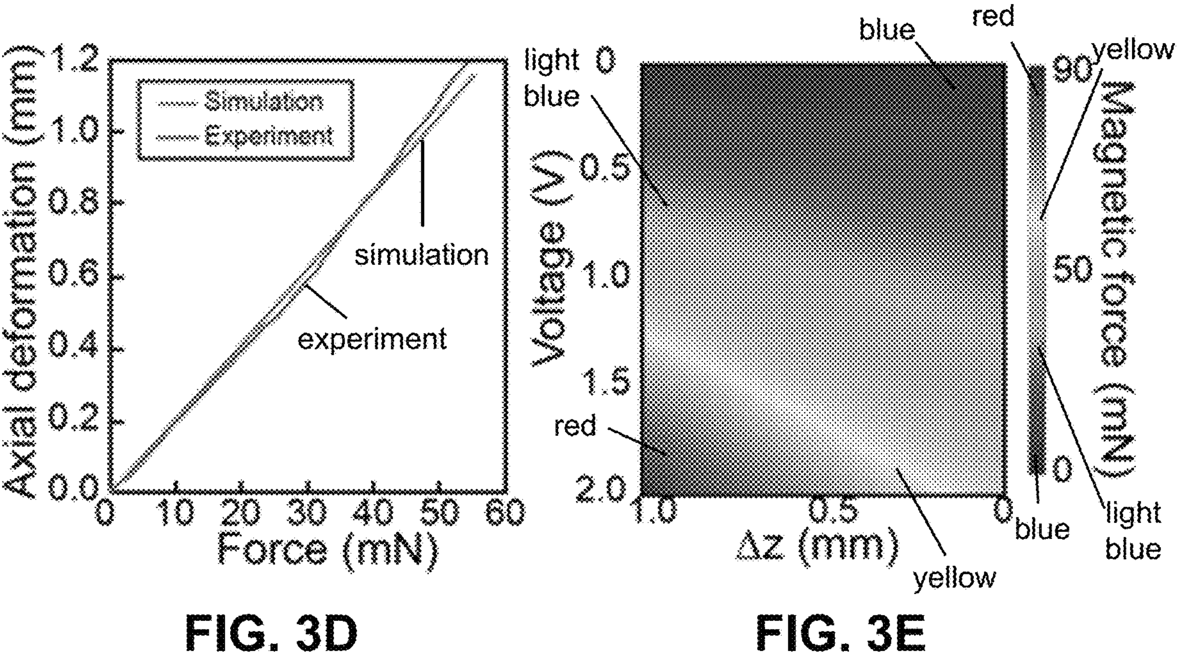
FIG. 3D
FIG. 3E

Focus on Obj. A
Obj. A
Obj. B
Lens
Image Senser

Focus on Obj. B
Obj. A
Obj. B
Lens
Image Senser

Focus-stack
Obj. A
Obj. B
Lens
Image Senser

Scanning

Case I
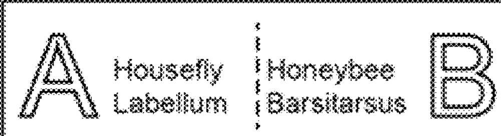
FIG. 4D
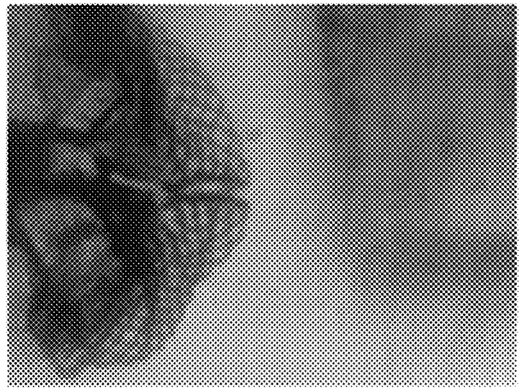
Focus on A
FIG. 4E
Focus on B
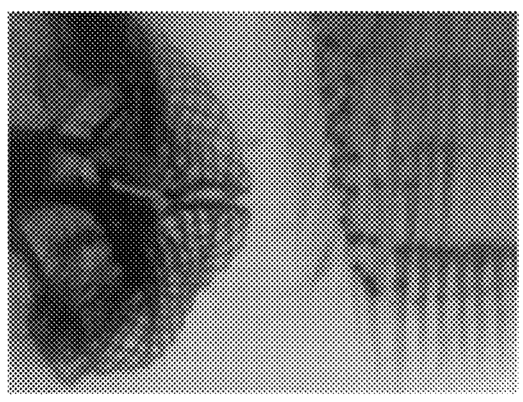
Focus-stack Case II
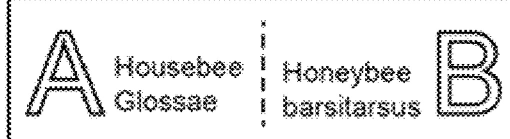
FIG. 4G
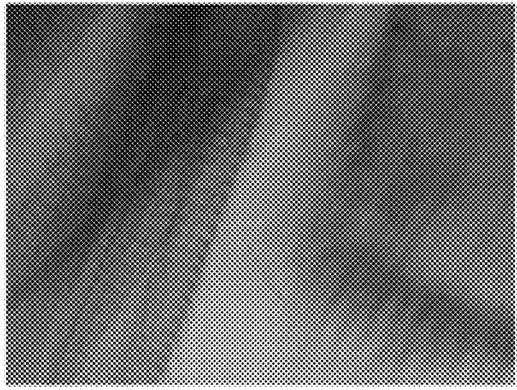
Focus on A
FIG. 4H
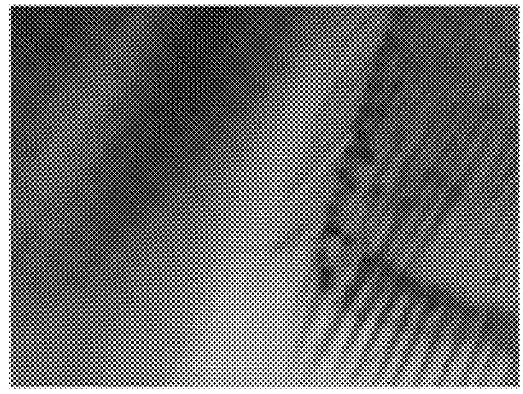
Focus on B
FIG. 4I
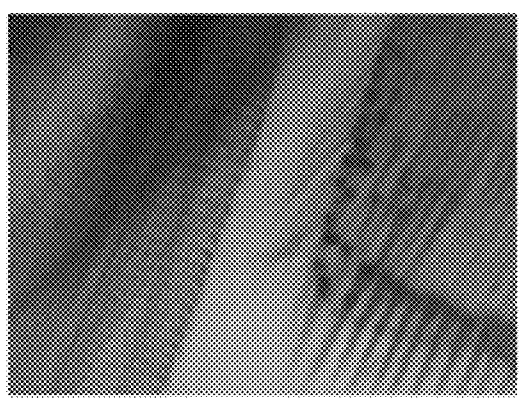
Focus-stack Case III
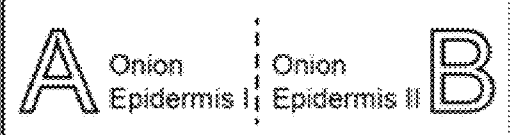
FIG. 4J
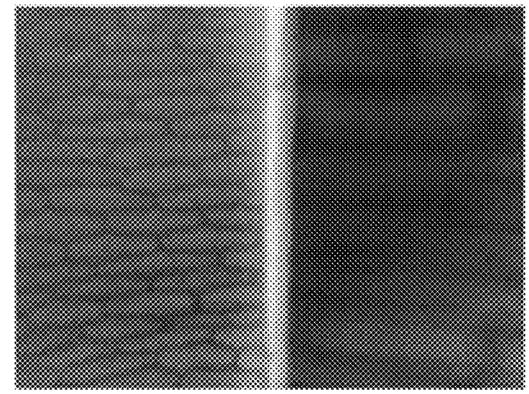
Focus on A
FIG. 4K
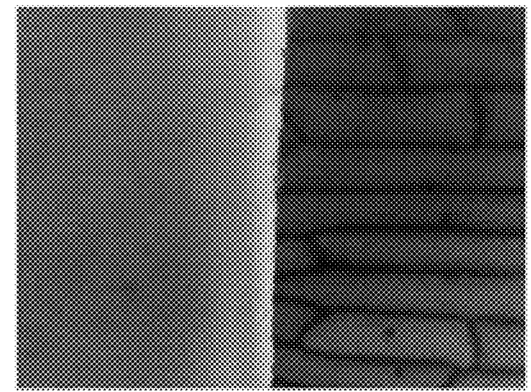
Focus on B
FIG. 4L
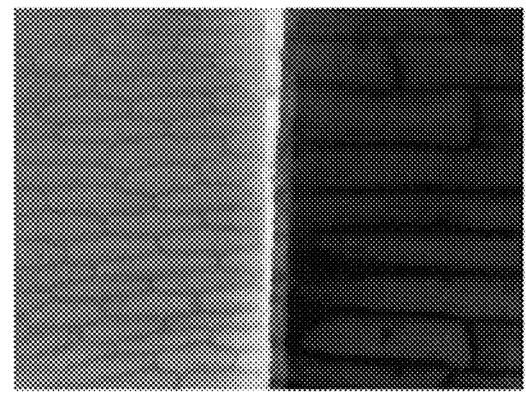
Focus-stack Schematic of slicing Grayscale interpolation

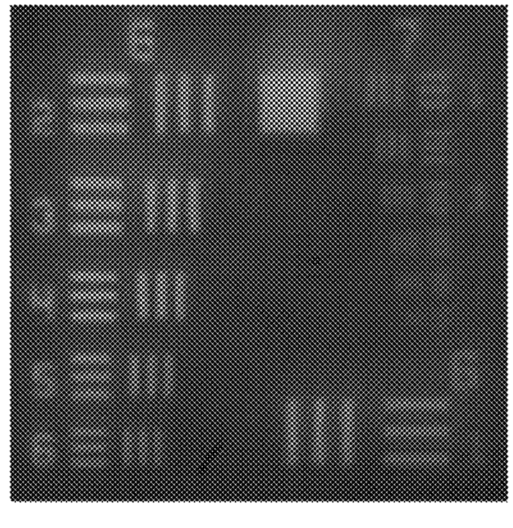
FIG. 8A
MTF of Lens Design 1
Broadband
Blue
Green
Red
Modulation Transfer Function
1.0
0.8
0.6
0.4
0.2
0.0
Red
Broadband
Blue
Green
0 50 100 150 200
Spatial Frequency (lp/mm)
FIG. 8B
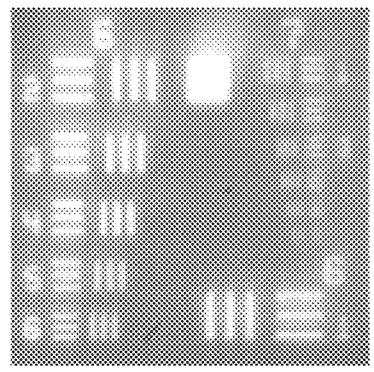
FIG. 8C
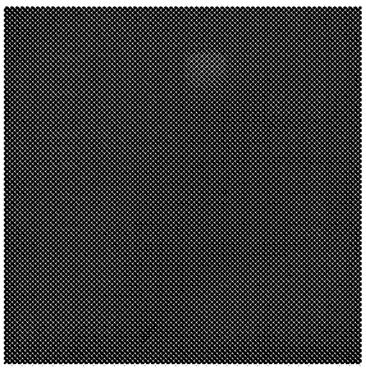
FIG. 8D
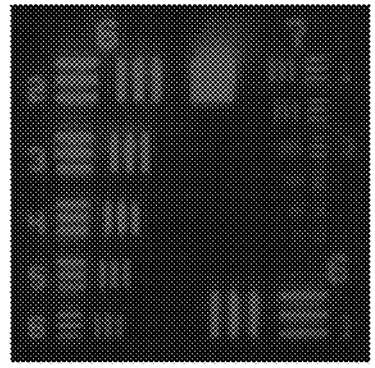
FIG. 8E

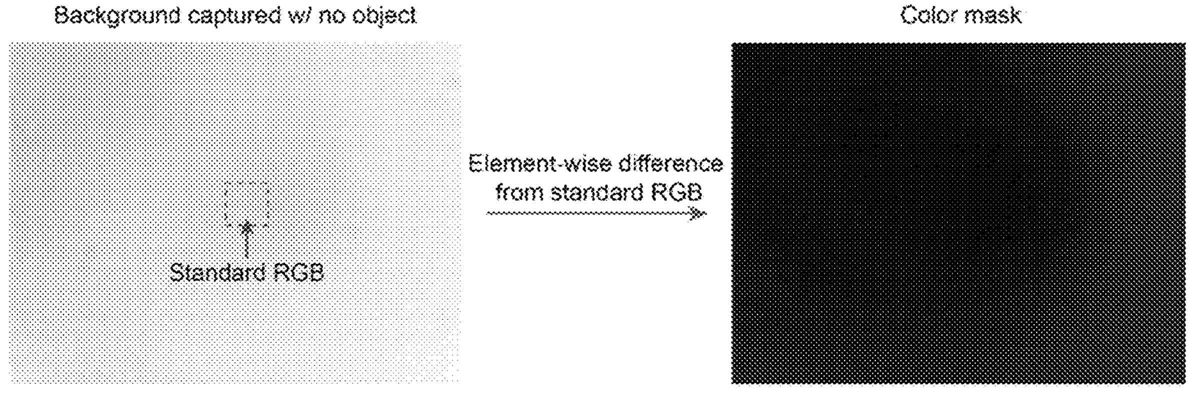
FIG. 9A
FIG. 9B
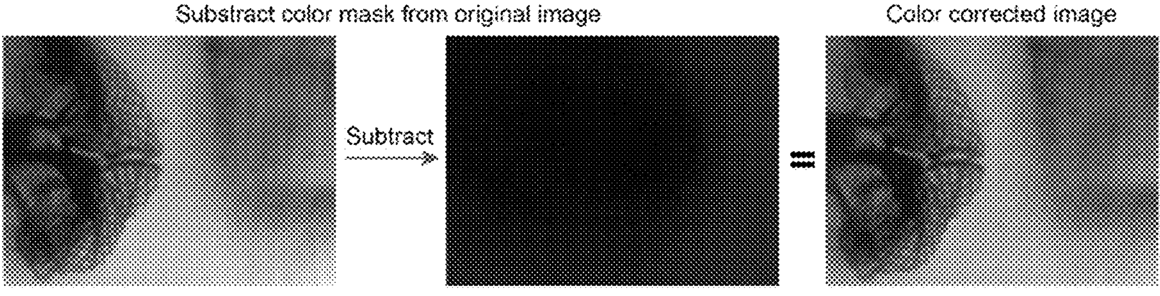
FIG. 9C
FIG. 9D

Case I

Case II

Case III

Case I

Case II

Case III

METHODS OF MAKING A LOW-COST MINIATURE ACCOMMODATING OPTICAL IMAGING SYSTEM

CROSS-REFERENCE TO RELATED APPLICATIONS

This application claims the benefit of priority to U.S. Provisional Patent Application No. 63/405,937, filed Sep. 13, 2022, which is hereby incorporated by reference in its entirety.

STATEMENT REGARDING FEDERALLY SPONSORED RESEARCH OR DEVELOPMENT

This invention was made with government support under grant number HL141933 awarded by the National Institutes of Health and grant number EEC1530734 awarded by the National Science Foundation. The government has certain rights in the invention.

BACKGROUND OF INVENTION

Despite advancements in creating optical lenses via additive manufacturing at increasingly smaller dimensions, challenges remain in precisely manufacturing the dimensionally compatible optomechanical components and assembling them into a functional imaging system. To tackle this issue, we use additive manufacturing to enable digitalized optomechanical components manufacturing, part-count-reduction design, and the inclusion of passive alignment features.

SUMMARY OF THE INVENTION

Provided herein are methods of making imaging systems.

Aspects disclosed herein include methods of making an imaging system, the method comprising: providing a lens; providing an optomechanical assembly, wherein providing an optomechanical assembly comprises manufacturing a component of the optomechanical assembly using additive manufacturing; providing an imaging sensor; and operably connecting the optomechanical assembly with said lens and said imaging sensor, forming said imaging system.

Without wishing to be bound by any particular theory, there may be discussion herein of beliefs or understandings of underlying principles relating to the devices and methods disclosed herein. It is recognized that regardless of the ultimate correctness of any mechanistic explanation or hypothesis, an embodiment of the invention can nonetheless be operative and useful.

BRIEF DESCRIPTION OF THE DRAWINGS

FIG. 1A: Conceptual illustration of focal plane adjustment principle and certain components. FIG. 1B: Exploded view of the CAD model of the miniaturized optical microscope. FIG. 1C: Microscope components used in the assembly, including lenses with different focal length and corresponding elastic lens holders, IR-cutoff filter, enclosure components, focusing motor components and CMOS imaging sensor. FIG. 1D: Schematic illustration of microscope assembly process. FIG. 1E: Photo of packaged miniaturized optical microscope with 3D printed components.

FIGS. 2A-2N: Design and characterization of imaging lenses used on 3D printed optical microscope. FIG. 2A: Imaging characteristic of the aspherical lens optimized under 532 nm illumination in Zemax. Scale bar: 1 mm. FIGS. 2L-2N: Images of USAF 1951 resolution target acquired under 532 nm (green light) illumination using (FIG. 2L) 3D printed lens, (FIG. 2M) Edmund lens and (FIG. 2N) Thorlabs lens, respectively.

FIGS. 3A-3F: Working principle and optimization of elastic lens mount. FIG. 3A: Working principle of VCM. FIG. 3B: CAD model and boundary conditions of elastic lens mount used for simulated compression test in ANSYS. Scale bar: 1 mm Insets: zoomed-in view of definition of strut angle. FIG. 3C: Comparison of maximum axial deformation and Poisson ratio for different lens holder designs. Insets: zoomed-in view of designs featuring negative, 0 and positive strut angles, respectively. FIG. 3D: Comparison of experimental and simulated elastic response of lens holder in compression tests. FIG. 3E: Magnetic force exerted on elastic lens holder as a function of axial distance and applied voltage. FIG. 3F: Axial displacement of the elastic lens holder during compression and extension.

FIGS. 4A-4L: Demonstration active focusing and extended depth of field via focus stacking. Schematic illustrations of three distinct imaging modes: Lens focusing on the distal object A (FIG. 4A); lens focusing of the closer object B (FIG. 4B); and focus-stacking mode by capturing a series of images while axially scanning the imaging lens (FIG. 4C). Case I: Schematic illustration of object A (housefly labellum) and object B (honeybee barsitarsus) and the recorded images: (FIG. 4D) focusing on housefly labellum, (FIG. 4E) focusing on honeybee barsitarsus, and (FIG. 4F) focus-stacked image that brings object A and B simultaneously in focus. Case II: Schematic illustration of object A (housebee glossae) and object B (honeybee barsitarsus) and the recorded images: (FIG. 4G) focusing on housebee glossae, (FIG. 4H) focusing on honeybee barsitarsus, and (FIG. 4I) focus-stacked image that brings object A and B simultaneously in focus. Case III: Schematic illustration of object A (onion epidermis I) and object B (onion epidermis II) and the recorded images: (FIG. 4J) focusing on onion epidermis I, (FIG. 4K) focusing on onion epidermis II, and (FIG. 4L) focus-stacked image that brings object A and B simultaneously in focus.

FIGS. 8A-8E: Images acquired by AM43 under (FIG. 8A) green illumination (532 nm), (FIG. 8C) broadband illumination, (FIG. 8D) blue illumination (488 nm) and (FIG. 8E) red illumination (632.8 nm) and (FIG. 8B) extracted MTF.

FIGS. 9A-9D: Color correction algorithm applied to single frames. FIG. 9A: Color background used to calculate the color mask for color correction. FIG. 9B: Color mask obtained by calculating the element-wise difference between the standard RGB value. FIG. 9C: The color mask is subtracted from the original image. FIG. 9D: Color corrected image used for focus stacking.

(FIG. 10A) focusing on house fly labellum, (FIG. 10B) focusing on honeybee barsitarsus and (FIG. 10C) focus stacked images. Case II: (FIG. 10D) focusing on housebee glossae, (FIG. 10E) focusing on honeybee barsitarsus and (FIG. 10F) focus stacked images. Case III: (FIG. 10G) focusing on epidermis I, (FIG. 10H) focusing on epidermis II and (FIG. 10I) focus stacked images.

(FIG. 11A) focusing on house fly labellum, (FIG. 11B) focusing on honeybee barsitarsus and (FIG. 11C) focus stacked images. Case II: (FIG. 11D) focusing on housebee glossae, (FIG. 11E) focusing on honeybee barsitarsus and (FIG. 11F) focus stacked images. Case III: (FIG. 11G) focusing on epidermis I, (FIG. 11H) focusing on epidermis II and (FIG. 11I) focus stacked image.

STATEMENTS REGARDING CHEMICAL COMPOUNDS AND NOMENCLATURE

Figure 1A:
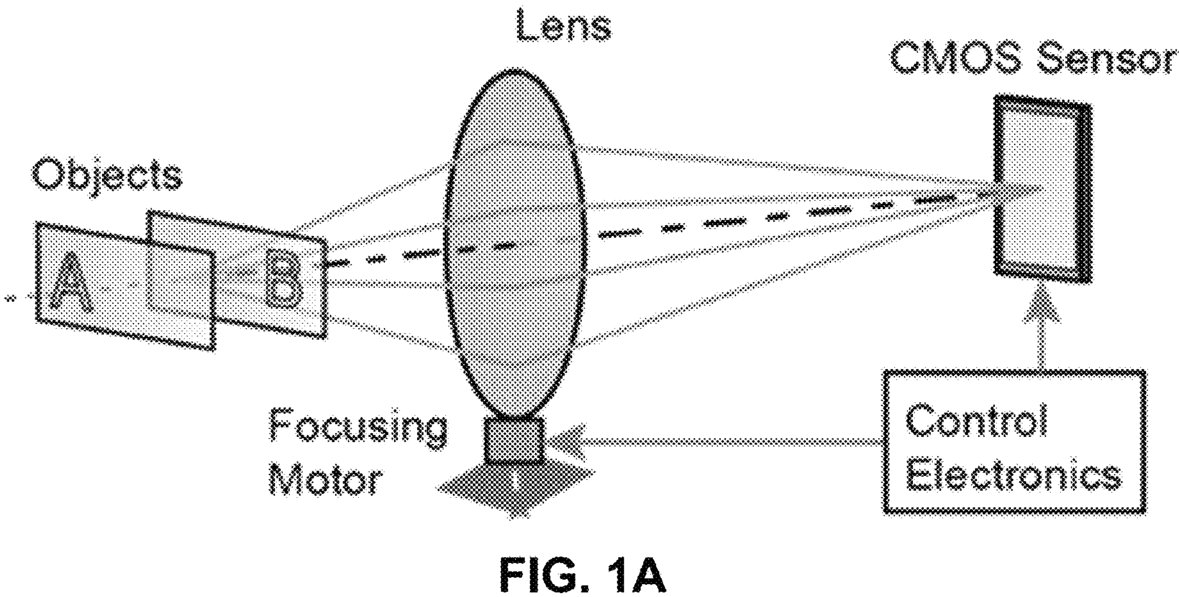
FIGS. 1A-1E: System design and assembly flowchart of the 3D printed miniature accommodating optical microscope.
Figure 1B:
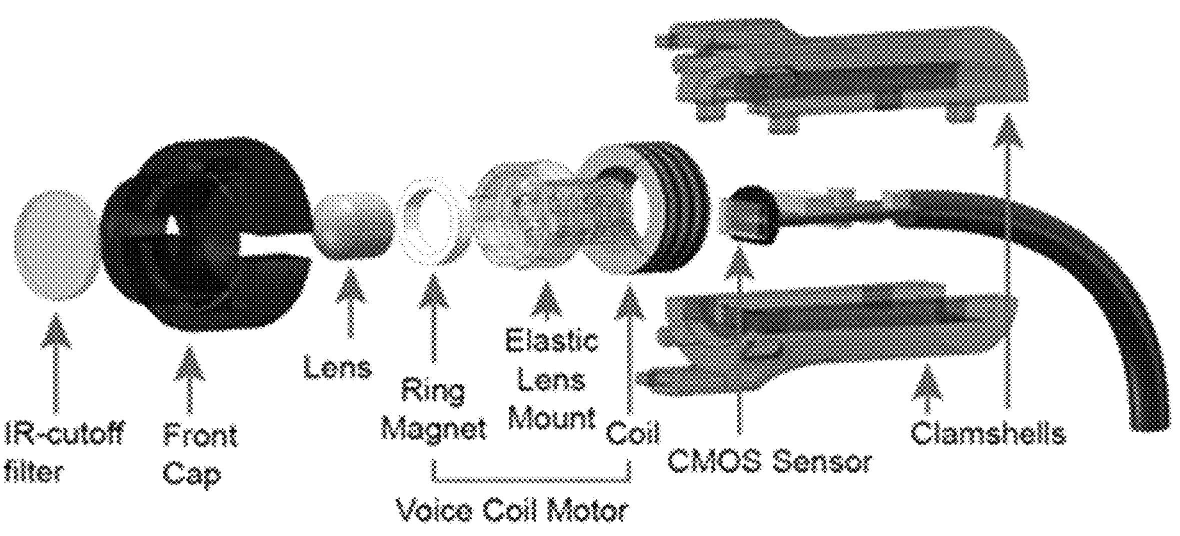

In general, the terms and phrases used herein have their art-recognized meaning, which can be found by reference to standard texts, journal references and contexts known to those skilled in the art. The following definitions are provided to clarify their specific use in the context of the invention.

The term "additive manufacturing" refers to any of the various methods of manufacturing in which material is deposited, joined, or solidified. For example the term refers to any variety of 3D printing, including material extrusion, fused deposition modeling (FDM), construction 3D printing, micro 3D printing, bio 3D printing, vat polymerization, stereolithography (SLA), liquid crystal display (LCD), digital light processing (DLP), projection microstereolithography (PμSL), lithography-based metal manufacturing (LMM), micro-stereolithography (μSLA), two photon polymerization (TPP), powder bed fusion (PBF), selective laser sintering (SLS), micro selective laser sintering (pSLS), laser powder bed fusion (LPBF), electron beam melting (EBM), material jetting (MJ), aerosol jet, plastic freeforming, nanoparticle jetting (NPJ), binder jetting, metal binder jetting, polmer binder jetting, sand binder jetting, multi jet fusion, high speed sintering, selective absorption fusion, directed energy deposition (DED), laser directed energy deposition (L-DED), powder laser energy deposition, wire arc additive manufacturing (WAAM), wire electron beam energy deposition, cold spray, molten direct energy deposition, sheet lamination, laminated object manufacturing (LOM), viscous lithography manufacturing (VLM), composite based additive manufacturing (CBAM), selective lamination composite object manufacturing (SLCOM), ultrasonic consolidation (UC), or any combination thereof. The term also refers to any of the manufacturing methods disclosed in Tumbleston, J. R. et al. Additive manufacturing. Continuous liquid interface production of 3D objects. Science 347, 1349-1352, doi:10.1126/science.aaa2397 (2015); Toombs, J. T. et al. Volumetric additive manufacturing of silica glass with microscale computed axial lithography. Science 376, 308-312 (2022); van Lith, R. et al. 3D-Printing Strong High-Resolution Antioxidant Bioresorbable Vascular Stents. Advanced Materials Technologies 1, doi:10.1002/admt.201600138 (2016); Biehl, S., Danzebrink, R., Oliveira, P. & Aegerter, M. A. Refractive microlens fabrication by ink-jet process. Journal of Sol-Gel Science and Technology 13, 177-182, doi:10.1023/a:1008648615758 (1998); Li, J. et al. 3D-Printed Micro Lens-in-Lens for In Vivo Multimodal Microendoscopy. *Small,* 2107032 (2022); Toulouse, A. et al. Ultra-compact 3D-printed wide-angle cameras realized by multi-aperture freeform optical design. Optics Express 30, 707-720 (2022); Gissibl, T., Thiele, S., Herkommer, A. & Giessen, H. Two-photon direct laser writing of ultracompact multi-lens objectives. Nature Photonics 10, 554-560, doi:10.1038/nphoton.2016.121 (2016); Yang, S. & Zhao, Y. F. Additive manufacturing-enabled part count reduction: a lifecycle perspective. *Journal of mechanical design* 140 (2018); Rael, R. & San Fratello, V. *Printing architecture: Innovative recipes for 3D printing*. (Chronicle Books, 2018); Yu, C. et al. Photopolymerizable biomaterials and light-based 3D printing strategies for biomedical applications. Chemical reviews 120, 10695-10743 (2020); Tetsuka, H. & Shin, S. R. Materials and technical innovations in 3D printing in biomedical applications. Journal of Materials Chemistry B 8, 2930-2950 (2020); Popov, V. V. et al. Design and 3D-printing of titanium bone implants: brief review of approach and clinical cases. Biomedical engineering letters 8, 337-344 (2018); Shapiro, A. A. et al. Additive manufacturing for aerospace flight applications. Journal of Spacecraft and Rockets, 952-959 (2016); Ichida, Y. Current Status of 3D Printer Use among Automotive Suppliers: Can 3D Printed-parts Replace Cast Parts. IFEAMA SPSCP 5, 69-82 (2016); Lecklider, T. 3D printing drives automotive innovation. *EE-Evaluation Engineering* 56, 16-20 (2017); MacDonald, E. & Wicker, R. Multiprocess 3D printing for increasing component functionality. *Science* 353, aaf2093 (2016); Duda, T. & Raghavan, L. V. 3D Metal Printing Technology. Ifac Papersonline 49, 103-110, doi:10.1016/j.ifacol.2016.11.111 (2016); Zhang, Y., Wu, L., Zou, M., Zhang, L. & Song, Y. Suppressing the Step Effect of 3D Printing for Constructing Contact Lenses. Advanced Materials 34, 2107249 (2022); Shao, G., Hai, R. & Sun, C. 3D Printing Customized Optical Lens in Minutes. Advanced Optical Materials 8, doi:10.1002/adom.201901646 (2019); Gawedzinski, J., Pawlowski, M. E. & Tkaczyk, T. S. Quantitative evaluation of performance of three-dimensional printed lenses. Optical engineering 56, 084110 (2017); Dylla-Spears, R. et al. 3D printed gradient index glass optics. Science advances 6, eabc7429 (2020); Chen, X. et al.

High-Speed 3D Printing of Millimeter-Size Customized Aspheric Imaging Lenses with Sub 7 nm Surface Roughness. Adv Mater 30, e1705683, doi:10.1002/adma.201705683 (2018); and Assefa, B. G. et al. Imaging-quality 3D-printed centimeter-scale lens. Optics express 27, 12630-12637 (2019); or any combination thereof; or any combination with a method in the previous sentence.

The term "assembly machinery" or "assembly platform" refers to an apparatus or combination of apparatuses designed to assemble components into a complete or partial device. Such assembly machinery may run independent of human input outside of initial human input. Assembly machinery may include a CNC machine, a robotics system, a conveyor system, packaging equipment, or specialized manufacturing machinery. Such assembly machinery may include tools, such as a drill, a saw, a grinder, a sander, an oscillating tool, a rotary tool, a drill press, a lathe, a router, a band saw, a planer, a wrench, a screwdriver, a hammer, or other tools.

The term "clamshell" refers to a piece that is designed to interface with another clamshell piece to form a new piece. The pair of clamshells is designed to hold a component inside the new piece, and secure said component against unintended motion, without damaging the component. The pair of clamshells can interface with one another reversibly or permanently. The pair of clamshells can interface with one another via passive alignment, including snap-fit. When interfaced, the new piece may have an opening on one of its surfaces, allowing the extension of the component through the opening, or allowing the insertion of another object to interface with the component while enclosed. In some cases, the new piece may have such an opening on multiple surfaces. Further, the clamshells can also provide mechanical and optical shielding from external perturbations.

The term "elastic material" or "elastic component" respectively refer to a material or component with the ability to resist a distorting force and to return to its original size and shape when that force is removed. For the purposes herein, elastic material or elastic component refers specifically to a material or component with a Young's modulus of less than 2 GPa in at least one direction when a force is applied in that dimension.

The term "elastic lens mount" refers to an optomechanical lens mount that is elastic in the axial direction. In some examples, an elastic lens mount may include a lens mount, a ring magnet mount, and a complaint platform, into a monolithic elastic lens mount. In some examples, the complaint platform is the portion of the elastic lens mount that is compressed and decompressed when an axial force is introduced and removed, respectively. In some examples, the lens mount is capable of accepting a lens. In some examples, the ring magnet mount is capable of accepting a ring magnet. In some examples, the elastic lens mount is compressed up to 1.2 mm when the force is applied.

The term "immobilizing material" or "immobilizing component" respectively refer to a material or component within a device or assembly that is able to interact with a second component, such that the second component is unable to move, or is immobilized, relative to the immobilizing material or immobilizing component. Such immobilization may be the result of a physical, electrical, magnetic, or other interaction. For example, a second component may be immobilized by the immobilizing component because the second component is connected to the device or assembly such that the second component is physically held between the immobilizing component and a third component.

The term "passive alignment" refers to the mechanical alignment of parts for assembly, leading to a reproducible alignment. Such mechanical alignment relies heavily on manufacturing tolerances. In contrast, "active alignment" relies on active feedback to correct an alignment error. For example, passive alignment may include a snap-fit, a fastener, a screw, an interference fit, a peg-in-hole, a latch, or any combination thereof.

The term "photo-curable resin" or "photopolymer" refers to a polymer or other substance that changes its properties when exposed to light. For example, some photo-curable resins harden or cure when exposed to light. Some photo-curable resins change their properties when exposed to visible light. Some photo-curable resins change their properties when exposed to ultraviolet light. Photo-curable resins may require a varying amount of time exposed to light to fully cure. For example, some photo-curable resins may fully cure within seconds, while other photo-curable resins may not fully cure until hours of exposure to light. Some photo-curable resins comprise components that cross-link when exposed to light.

The term "photodetector" refers to any sensor capable of detecting light or other electromagnetic radiation. The photodetector may detect light or other electromagnetic radiation by a photoconductive effect, a photoelectric effect, a thermal effect, a polarization effect, a photochemical effect, weak interaction effects, or any combination thereof. The photodetector may be an MSM photodetector, a photodiode, an avalanche photodiode, a phototransistor, a charge-coupled device (CCD), a CMOS image sensor (CIS), or a photomultiplier tube (PMT), or any combination thereof. The photodetector may be a gaseous ionization detector, a photomultiplier tube, a phototube, a multichannel plate detector, an active-pixel sensor, a cadmium zinc telluride radiation detector, a charge-coupled device, a HgCdTe infrared detector, a reverse-biased LED, a photoresistor, a photodiode, a phototransistor, a pinned photodiode, a quantum dot photoconductor, a quantum dot photodiode, a semiconductor detector, a silicon drift detector, a photovoltaic cell, a bolometer, a microbolometer, a cryogenic detector, a pyroelectric detector, a thermopile, a Golay cell, a photoreceptor cell, a chemical detector, a polarization-sensitive photodetector, or any combination thereof.

In an embodiment, a composition or compound of the invention, such as an alloy or precursor to an alloy, is isolated or substantially purified. In an embodiment, an isolated or purified compound is at least partially isolated or substantially purified as would be understood in the art. In an embodiment, a substantially purified composition, compound or formulation of the invention has a chemical purity of 95%, optionally for some applications 99%, optionally for some applications 99.9%, optionally for some applications 99.99%, and optionally for some applications 99.999% pure.

DETAILED DESCRIPTION OF THE INVENTION

In the following description, numerous specific details of the devices, device components and methods of the present invention are set forth in order to provide a thorough explanation of the precise nature of the invention. It will be apparent, however, to those of skill in the art that the invention can be practiced without these specific details.

Certain Exemplary Aspects and Embodiments

Various aspects are contemplated and disclosed herein, several of which are set forth in the paragraphs below. It is explicitly contemplated and disclosed that any aspect or portion thereof can be combined to form an aspect. In addition, it is explicitly contemplated and disclosed that: any reference to Aspect 6 includes reference to Aspects 6a, 6b and/or 6c, and any combination thereof (i.e., any reference to an aspect includes reference to that aspect's lettered versions). Moreover, the terms "any preceding aspect" and "any one of the preceding aspects" means any aspect that appears prior to the aspect that contains such phrase (for example, the sentence "Aspect 15: The material, device, electrolyte, or method of any preceding Aspect . . . " means that any Aspect prior to Aspect 15 is referenced, including letter versions). For example, it is contemplated and disclosed that, optionally, any composition, method, or formulation of any of the below aspects may be useful with or combined with any other aspect provided below. Further, for example, it is contemplated and disclosed that any embodiment or aspect described above may, optionally, be combined with any of the below listed aspects or any portion(s) thereof.

Aspect 1: A method of making an imaging system, the method comprising:

providing a lens;

providing an optomechanical assembly, wherein providing an optomechanical assembly comprises manufacturing a component of the optomechanical assembly using additive manufacturing;

providing an imaging sensor; and operably connecting the optomechanical assembly with said lens and said imaging sensor, forming said imaging system.

Aspect 2: The method of Aspect 1, wherein providing an optomechanical assembly comprises manufacturing a component of the optomechanical assembly using micro-continuous liquid interface production (μCLIP) 3D printing.

Aspect 3: The method of Aspect 2, wherein each component of the optomechanical assembly comprises two or more functions selected from the group consisting of: system structural frame, mechanical mount for the lens, mechanical mount for the imaging sensor, optical enclosure to block stray light, elastic structure, an mechanical mounts for actuating elements as part of the optomechanical sensor.

Aspect 4: The method of Aspect 2 or 3, wherein each component of the optomechanical assembly comprises passive alignment features, allowing for assembly of the imaging system without assembly machinery or an assembly platform.

Aspect 5: The method of any one of Aspects 2-4, wherein the imaging system is discarded after a single use.

Aspect 6a: The method of any one of Aspects 2-5, wherein each component of the optomechanical assembly comprises a design that can be customized based upon at least one of the field of view of the lens, the magnification of the lens, the working distance of the imaging system, and the resolution of the imaging sensor, and is manufactured using additive manufacturing.

Aspect 6b: The method of any one of Aspects 2-6a, wherein each component of the optomechanical assembly can be printed at a low cost.

Aspect 6c: The method of Aspect 6b, wherein each component of the optomechanical assembly can be printed from less than USD $5, less than USD $4, less than USD $3, less than USD $2, less than USD $1, less than USD $0.50, less than USD $0.25, less than USD $0.10, less than USD $0.05, or less than USD $0.01.

Aspect 7: The method of any one of the preceding Aspects, wherein providing a lens comprises manufacturing a lens using additive manufacturing.

Aspect 8: The method of Aspect 7, wherein providing a lens comprises manufacturing the lens using micro-continuous liquid interface production (μCLIP) 3D printing.

Aspect 9: The method of Aspect 7 or 8, wherein the lens is manufactured using a photo-curable resin or photopolymer, wherein the photo-curable resin or photopolyer comprises a monomer and a photoinitiator.

Aspect 10: The method of Aspect 9, wherein the monomer is selected from the group consisting of: 1,6-hexanediol diacrylate (HDDA), 2-hydroxyethyl methacrylate (HEMA), polyethylene glycol diacrylate (PEGDA), trimethylolpropane triacrylate (TMPTA; TTA), urethane dimethacrylate (UDMA), triethylene glycol dimethacrylate (TEGDMA), bisphenyl A-glycidyl methacrylate (Bis-GMA), bisphenol A ethoxylate diacrylate (Bis-EDA), another meth(acrylate) monomer, another meth(acrylate) oligomer, trimethylolpropane tris(3-mercaptopropionate) (TMPMP), pentaerythritol tetra(3-mercaptopropionate) (PETMP), tris[2-(3-mercaptopropionyloxy) ethyl] isocyanurate (TMI), pentaerythritol tetrakis (3-mercaptopropionate) (PE-1), another thiol monomer, 1,4-butandiol dipent-4-yn-2-yl carbonate (4MPC), 2,2-bis[4-(2-hydroxy)ethoxyphenyl]propane dibut-3-yn-1-yl carbonate (BABC), another ene monomer, tricyclo[5.2.1.0] decane-4,8-dimethanol dibut-3-yn-1-yl carbonate (TCBC), and another yne monomer.

Aspect 11: The method of Aspect 9 or 10, wherein the photoinitiator is selected from the group consisting of: bis(2,4,6,-trimethylbenzoyl) phenylphosphine oxide (Irgacure 819; BAPO), benzophenone, 2-hydroxy-2-methyl-1-phenyl-propan-1-one (Irgacure 1173), 2-hydroxy-4'-(2-hydrooxyethoxy)-2-methylpropiophenone (Irgacure 2959), 2,2'-azobis[2-methyl-n-(2-hydroxyethyl) propionamide] (VA-086), 2,2-dimethoxy-2-phenylacetophenone (Irgacure 651; DMPA), diphenyl(2,4,6-trimethylbenzoyl) phosphine oxide (Darocure TPO; Lucirin TPO), lithium phenyl(2,4,6,-trimethylbenzoyl)phosphate (LAP), ethyl (2,4,6-trimethylbenzoyl) phenylphosphinate (Lucirin TPO-L), camphorquinone (CQ), bis (4-methoxybenzoyl) diethylgermannium (Ivocerin), 5-amino-2-benzyl-1H-benzo[de]isoquinoline-1,3(2H)-dione (NDP2), zinc tetraphenylporphyrin (ZnTPP), 3-nitro-9-octyl-9H-carbazole (C2), 2,6-bis (triphenylamine) dithieno[3,2-b:2',3'-d] phosphole oxide (TPA-DTP), 3-hydroxyflavone (3HF), tris (2,2-bipyridyl) dichlororuethnium (II) hexahydrate (Ru), eosin Y, and another photoinitator sensitive to UV or visible light.

Aspect 12: The method of any one of Aspects 9-11 wherein the photo-curable resin or photopolymer further comprises a light absorbing material, and wherein the light absorbing material is selected from the group consisting of: 2-(2-hydroxy-5-methylphenyl)benzotriazole (Tinuvin 171), Sudan Black B, 2-(2H-benzotriazol-2-yl)-4,6-bis(1-methyl-1-phenylethyl)phenol (Tinuvin 234), 2-nitrophenyl phenyl sulfide (NPS), martius yellow, octocrylene, avobenzone, 2,5-bis(5-tert-butyl-benzoxazol-2-yl)thiophene (Benetex OB+), disodium 4,4'-bis(2-sulfonatostyryl)biphenyl (Benetex OB-M1), benzenepropanoic acid (BLS 99-2), 2,3,6,7-tetrahydro-9-methyl-1H,5H-quinolizino(9,1-gh)coumarin (Coumarin 102), morin hydrate, nitrofurazone, 5,12-naphthacenequinone (NTAQ), phenazine, 1,4-bis-(2-(5-phenyloxazolyl))-benzene (POPOP), quinolone yellow, 3,3',4',5,6-pentahydroxyflavone (Quercetin), salicylaldehyde, Sudan I, triamterene, UV386A, and 9,10-diethoxyanthracene (UVS-1101).

Aspect 13: The method of any one of the preceding Aspects, wherein the optomechanical assembly comprises an actuator.

Aspect 14: The method of Aspect 13, wherein providing an optomechanical assembly comprises manufacturing the actuator using additive manufacturing.

Aspect 15: The method of Aspect 14, wherein providing an optomechanical assembly comprises manufacturing the actuator using micro-continuous liquid interface production (μCLIP) 3D printing.

Aspect 16: The method of any one of Aspects 13-15, wherein the actuator comprises a lens focusing module.

Aspect 17: The method of Aspect 16, wherein providing an optomechanical assembly comprises manufacturing the lens focusing module using additive manufacturing.

Aspect 18: The method of Aspect 17, wherein providing an optomechanical assembly comprises manufacturing the lens focusing module using micro-continuous liquid interface production (μCLIP) 3D printing.

Aspect 19: The method of any one of the preceding Aspects, wherein the optomechanical assembly comprises a passive alignment feature.

Aspect 20: The method of any one of the preceding Aspects, wherein the optomechanical assembly comprises an elastic component.

Aspect 21: The method of any one of the preceding Aspects, wherein the optomechanical assembly comprises an immobilizing component.

Aspect 22: The method of any one of the preceding Aspects, wherein the optomechanical assembly is configured to move the lens thereby altering a distance between the lens and the imaging sensor.

Aspect 23: The method of any one of the preceding Aspects, wherein the optomechanical assembly comprises:

a clamshell;

a front cap; and an actuator comprising an elastic lens mount.

Aspect 24: The method of Aspect 23, wherein providing an optomechanical assembly comprises manufacturing at least one of the clamshell, the front cap, and the elastic lens mount using additive manufacturing.

Aspect 25: The method of Aspect 24, wherein providing an optomechanical assembly comprises manufacturing at least one of the clamshell, the front cap, and the elastic lens mount using micro-continuous liquid interface production (μCLIP) 3D printing.

Aspect 26: The method of any one of Aspects 23-25, wherein at least one of the clamshell, the front cap, and the elastic lens mount comprises at least two of the group consisting of: a passive alignment feature, an elastic component, and an immobilizing component.

Aspect 27: The method of any one of Aspects 23-26, wherein the clamshell comprises a passive alignment feature.

Aspect 28: The method of any one of Aspects 23-27, wherein the front cap comprises a passive alignment feature.

Aspect 29: The method of any one of Aspects 23-28, wherein the elastic lens mount comprises an elastic component.

Aspect 30: The method of any one of Aspects 23-29, wherein the front cap comprises an immobilizing component.

Aspect 31: The method of any one of Aspects 23-30, wherein the actuator is configured to move the lens thereby altering a distance between the lens and the imaging sensor.

Aspect 32a: The method of any one of the preceding Aspects, wherein the imaging system comprises a linear dimension that is less than or equal to about 30 cm.

Aspect 32b: The method of any one of the preceding Aspects, wherein the imaging system comprises a linear dimension that is between 25 cm and 35 cm, between 20 cm and 40 cm, between 10 cm and 50 cm, between 1 cm and 60 cm, between 500 mm and 1 cm, between 250 mm and 750 mm, or less than 1 cm.

Aspect 33a: The method of any one of the preceding Aspects, wherein the imaging system comprises a linear dimension that is less than or equal to about 1 mm.

Aspect 33b: The method of any one of the preceding Aspects, wherein the imaging system comprises a linear dimension that is between 1 mm and 10 mm, between 1 mm and 5 mm, between 500 μm and 2 mm, between 500 μm and 1 mm, between 100 μm and 1 mm, between 250 μm and 750 μm, between 200 μm and 800 μm, between 100 μm and 900 μm, between 300 μm and 700 μm, between 400 μm and 600 μm, or less than 100 μm.

Aspect 34: The method of any one of the preceding Aspects, wherein the imaging sensor comprises a photodetector.

Aspect 35: The method of Aspect 34, wherein the photodetector comprises a complementary metal-oxide-semiconductor (CMOS) sensor, a charge-coupled device (CCD) sensor, or another image sensing device.

The invention can be further understood by the following non-limiting examples.

Example 1A: 3D Printing a Low-Cost Miniature Accommodating Optical Microscope

Abstract

This decade had witnessed the tremendous progress in miniaturizing optical imaging systems[1-3]. Despite the advancements in 3D printing optical lenses at increasingly smaller dimensions[4-9], challenges remain in precisely manufacturing the dimensionally compatible optomechanical components and assembling them into a functional imaging system. To tackle this issue, here we report the use of 3D printing to enable digitalized optomechanical components manufacturing, part-count-reduction design, and the inclusion of passive alignment features, all for the ease of system assembly. We 3D printed optomechanical components of a penny-sized accommodating optical microscope in 50 minutes at a significantly reduced unit cost near $4. By actuating a built-in voice-coil-motor, we validated its accommodating capability to focus on specimens located at different distances, and further utilized a focus stacking function to greatly extended depth-of-field. The microscope can be readily customized and rapidly manufactured to respond to task-specific needs in form-factor and optical characteristics.

There are growing interests in miniaturing imaging platforms for potential commercial, research, and educational applications[1-3,10]. However, dealing with optical and optomechanical components with increasingly smaller size requires high manufacturing precision and tight system assembly tolerances to achieve diffraction-limited performance. Traditional lens manufacturing relies on costly and time-consuming lapping, grinding, and polishing processes. Injection molding can produce low-cost polymer lenses, but still requires precision machined molds for the high-performance features needed for optical applications[11-13]. Such applications also necessitate equally strict tolerances for system assembly and the alignment of numerous components; labor-intensive and costly tasks which often require highly trained personnel and precision alignment equipment.

Breaking this cost barrier calls for a cost-effective and scalable manufacturing solution. In contrast to traditional manufacturing processes, additive manufacturing (AM), also referred to as 3D printing, produces complex volumetric structures by the successive addition of building layers[14-17]. The evolution of AM has seen a rapid growth in satisfying the ever-increasing demands in producing geometrically complex parts and assemblies in a wide range of industries, including automobile[18-20], aerospace[21-23], biomedical[24-28], and architecture[27,28]. This has the potential to transform existing optical manufacturing processes by allowing for design customization directly from digital models without sacrificing manufacturing speed and cost. Its inherent geometric complexity advantages enable a part count reduction (PCR) design for producing a single monolithic part to replace existing multi-component assemblies, reducing lifecycle cost, improving performance, and eliminating further alignment[29].

AM has made great strides over the years to miniaturize optical components. Two-photon direct laser writing with sub-100 nm voxel resolution has demonstrated the fabrication of micro-lenses and lens-assemblies, but at a rather slow "point-by-point" patterning nature[30-33]. Inkjet printing benefits from the viscosity and surface tension of larger liquid resin droplets to more quickly 3D print optically smooth surfaces on a solid substrate[4,34]. However, additional molding steps are required for free-standing optical elements[7,35]. A significant step in tackling this speed/accuracy trade-off was reported by us and other groups by using projection micro-stereolithography (PμSL) and its derivatives[5,8,9,36]. PμSL parallelizes the 3D printing process by curing an entire fabrication layer in a single exposure, being capable of printing millimeter-sized aspherical lenses in an hours.

Micro-continuous Liquid Interface Production (μCLIP) reported further fabrication speed improvements by eliminating the lengthy resin-recoating step between the printing layers[37], further reducing fabrication time to minutes[8,9]. Apart from photopolymer optics, direct ink writing (DIW) and computed axial lithography (CAL) have been used to fabricate gradient index (GRIN) and free form optics from silica-based materials, although they require a sintering process utilizing high temperature over 1000° C.[6,38]. In addition to 3D printed optical components, filament deposition 3D printers have been used to fabricate the optomechanics for the OpenFlexure Microscope design which provides precise mechanical sample manipulation in a lightweight and compact device[39]. These advancements have made AM optical lenses more economically favorable, however, there are still unsolved challenges in precisely manufacturing and assembling the dimensionally compatible optomechanical components into a miniaturized optical imaging system.

Unifying the fabrication processes for optics and optomechanics using AM would retain the low-cost, small-size benefit of the previously mentioned methods while improving the scalability and design customizability through additive manufacturing. In this article, we demonstrate the capability to AM optical and optomechanical components for a miniaturized imaging platform featuring an aspherical lens and voice coil motor (VCM). System configuration can be tailored for a range of lens focal lengths or procurement sources. Furthermore, the VCM features a near-zero Poisson's ratio 3D printed compliant foundation to minimize interference during focusing, preserving customizability in imaging magnification. All optomechanical components are 3D printed in a single batch within 50 minutes with minimal assembly requirements, at a system cost of less than $4. We have experimentally compared the imaging characteristics of 3D printed lenses with commercial polymer lenses. Finally, we demonstrate the active focusing through actuating the built-in VCM, and further implement the focus stacking function by combining multiple images taken while axially translating the imaging lens, to greatly extended the depth of field (DOF).

FIGS. 1A-1E illustrate the modular design of the miniaturized accommodating microscope. A focusing motor translates the imaging lens along the optical axis to form magnified images onto the CMOS sensor for objects A and B located at different positions (FIG. 1A). Optical magnification requires translating the imaging lens further away from the CMOS sensor, and thus, the planar configurations commonly found in the cell-phone cameras are not applicable. While the static DOF is shallow, successively acquired frames along the optical axis can be digitally combined using a focus stacking function, thereby extending the DOF. The system design (FIG. 1B) incorporates two primary strategies—PCR and passive alignment features—to simplify assembly.

Figure 1C:
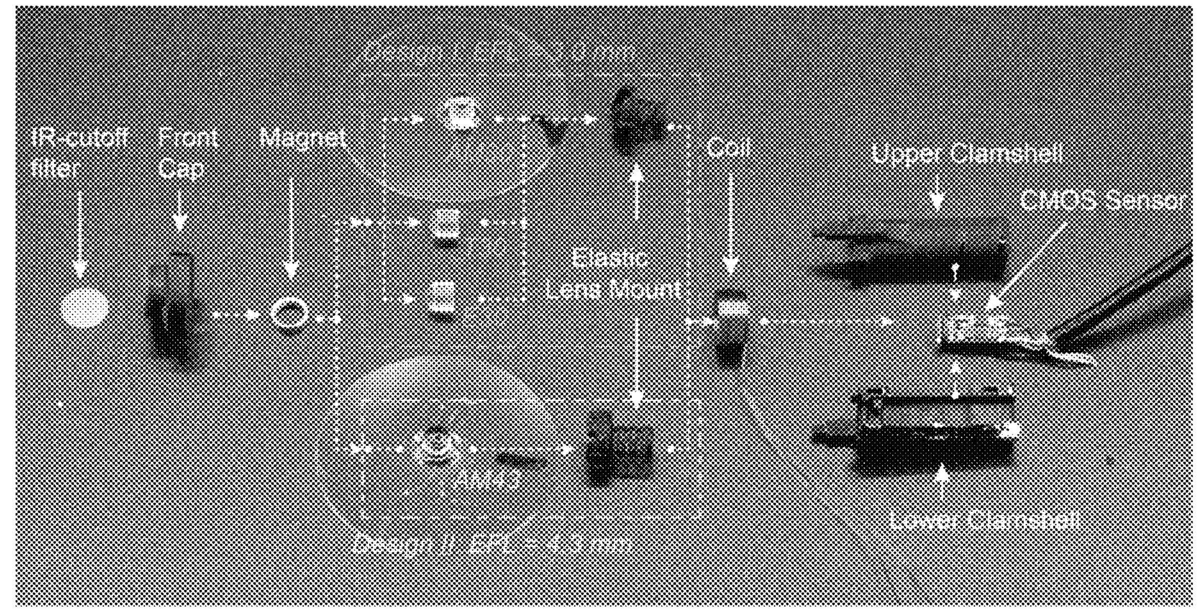
Figure 1D:
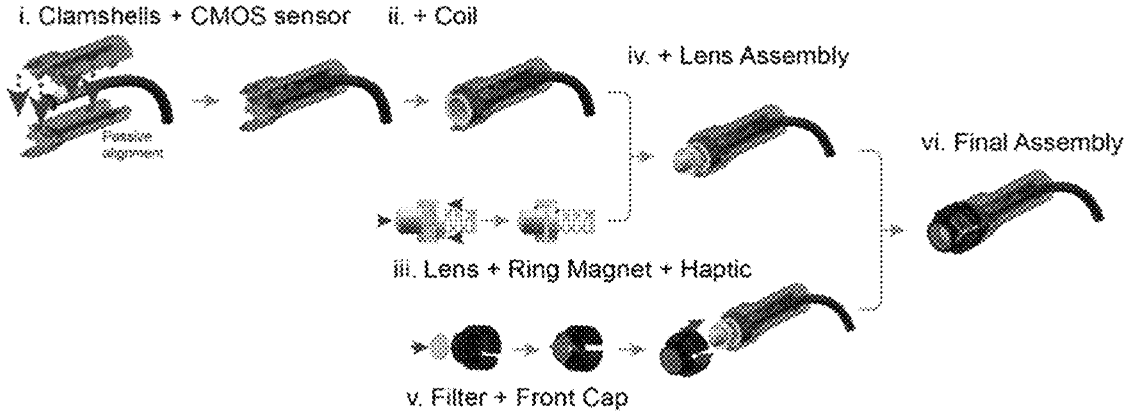

PCR strategy reduces system part count to only five 3D printed components (lens, elastic lens mount, front cap and clamshells) and four off-the-shelf components (IR-cutoff filter, ring magnet, coil and CMOS sensor) (FIG. 1B), with a full assembly chart of several customizable options shown in FIG. 1C. The fabrication of all shown 3D printed components is unified using the homemade μCLIP system[8] (FIGS. 5A-5D). AM offers customizable options in two progressive steps. Firstly, imaging lens effective focal length (EFL) can be tailored for specific working distances and imaging magnifications. Two options (EFL=4.3 mm and EFL=3.0 mm) are shown in FIG. 1C. The digital design model of the elastic lens mount can be readily modified, and 3D printed with a desirable offset between the lens and CMOS sensor. Secondly, taking the design for EFL=3 mm as an example, 3D printed lens (AM30) can be interchanged with off-the-shelf polymer lenses ("T30" and "E30" in FIG. 1C). We intentionally constrained EFL and lens outer diameter to be compatible with commercial polymer lenses to improve design modularity. All the components are snapped into place using passive alignment features without the needs for a dedicate fixture and machines (FIG. 1D). The assembled miniature microscope shown in FIG. 1E has the outer dimension of 8.10×8.10×29.85 $mm^3$, comparable to a penny. Such methods also led to the dramatic cost reductions shown in Table 1. The estimated unit cost of the whole system is $3.74, making it potentially disposable.

TABLE 1

Itemized price for each component.

| Component | Unit Cost ($) | 3D Printing Time |
|---|---|---|
| Optomechanics | 1.079 | 45 min. 21 s |
| Aspherical lens | 0.069 | 3 min. |
| Ring magnet | 0.65 | N/A |
| Coil | 0.47 | N/A |
| CMOS sensor | 1.371 | N/A |
| IR cutoff filter | 0.10 | N/A |
| Total cost | 3.739 | |

Figure 2A:
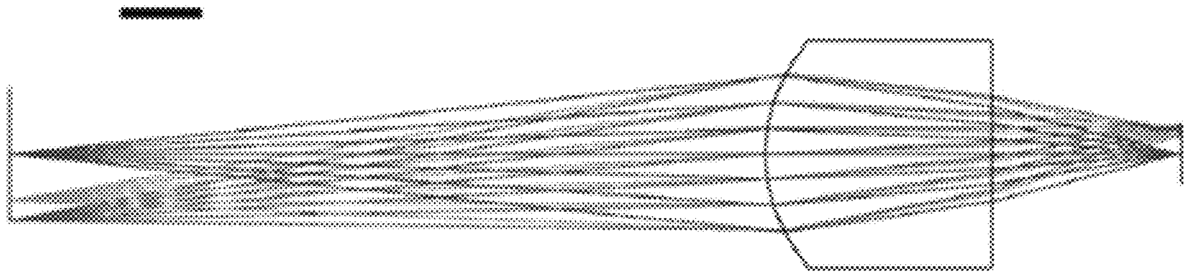
Figure 2B:
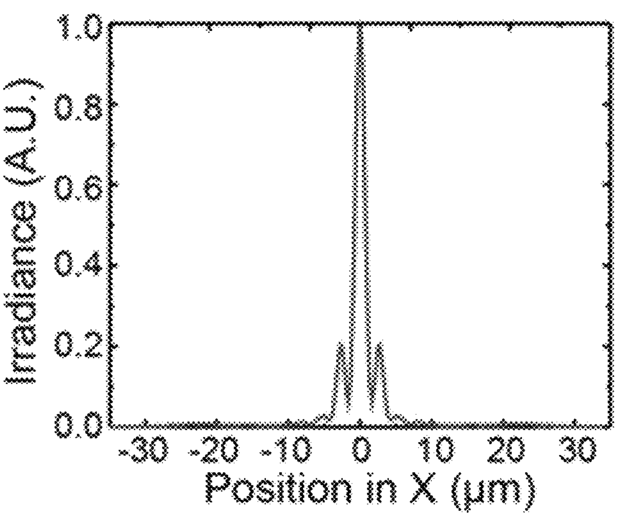
FIG. 2B: Simulated point spread function (PSF) for the optimized aspherical lens.
Figures 2C, 2D, 2E, 2F, 2G, 2H, 2I, 2J, 2K:
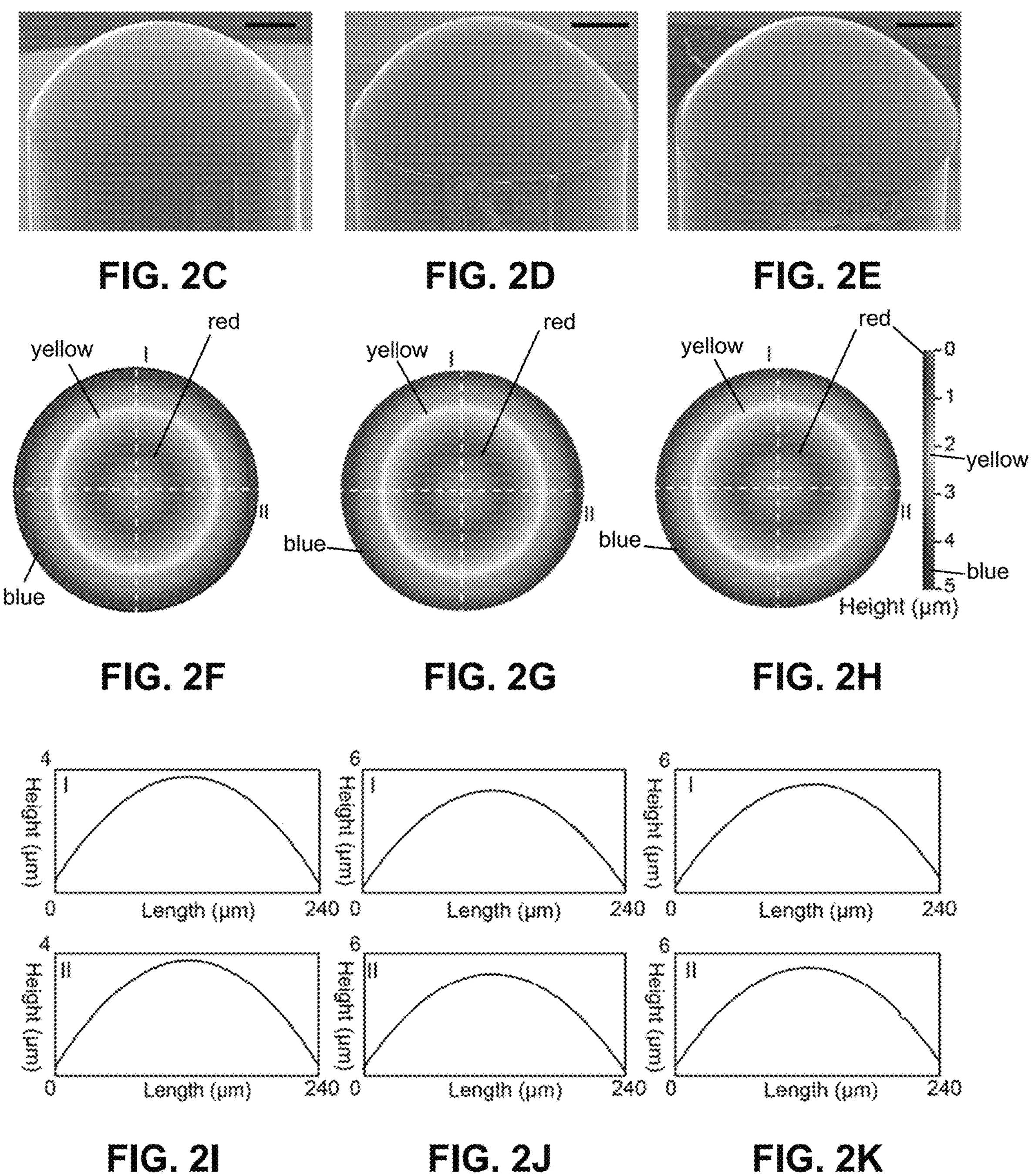
FIGS. 2C-2E: Tilted view of (FIG. 2C) 3D printed aspherical lens, (FIG. 2D) plastic aspherical lens from Edmund Optics (15-271) and (FIG. 2E) molded acrylic aspherical lens from Thorlabs, Inc. (APL0303) respectively. Scale bars: 500 μm.
FIGS. 2F-2H: surface profile measured by white light interferometry for (FIG. 2F) 3D printed lens, (FIG. 2G) Edmund lens and (FIG. 2H) Thorlabs lens, respectively.
FIGS. 2I-2K: extracted line profiles corresponding to the dashed lines I and II in FIG. 2F to FIG. 2H for (FIG. 2I) 3D printed lens, (FIG. 2J) Edmund lens and (FIG. 2K) Thorlabs lens, respectively.
Figures 2L, 2M, 2N:
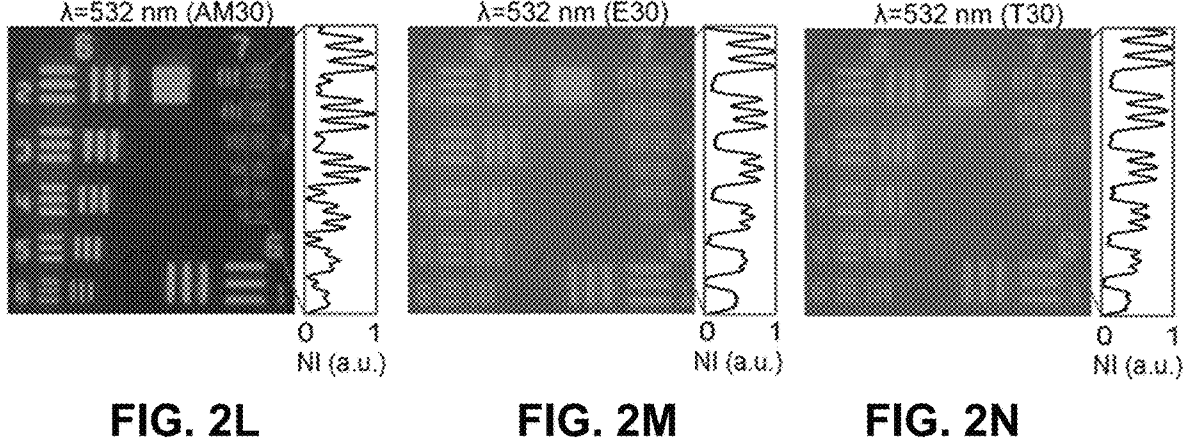

We experimentally characterized each interchangeable lens option shown for Design 1 (FL=3.0 mm): AM30 (Aspherical lens 3D printed in house), E30 (15-271, Edmund Optics) and T30 (APL0303, Thorlabs Inc.) (FIGS. 2A-2N). Optical properties of photocurable resin (detailed recipe in Method) were measured using a spectroscopic ellipsometer (J. A. Woollam M2000U). The wavelength-dependent refractive index of photocurable resin was extracted from ellipsometry measurements and was further used as inputs to optimize the aspherical profile of AM30 using Zemax OpticStudio (optimized profile in Method). The wavelength-dependent refractive index determines the aspherical coefficients of 3D printed lens with a given aperture and focal distance. FIG. 2A and FIG. 2B depict the simulated ray diagram and point spread function (PSF), respectively. The optimized lens profile was loaded into μCLIP to fabricate AM30, whose scanning electron microscope (SEM, FEI Quanta 650 ESEM) image is shown in FIG. 2C. For comparison, we show the SEM images of E30 and T30 in FIGS. 2D and 2E, respectively. All three lenses have smooth aspherical surfaces, but with additional surface asperities found on E30 and T30. The distinct structural defects along the circumferences of E30 and T30 are common to all the lenses (N>10) we purchased from both vendors. The smooth surface profiles are further confirmed by optical profiler (Nexview, Zygo) measurement (FIGS. 2F-2H). Images captured with a 240-μm-diameter aperture for all three lenses illustrate smooth surface profiles. We extracted linear profiles (dashed lines I and II in FIGS. 2F-2H) for quantitative comparison. AM30 has the best surface smoothness (Ra=7.63 nm, FIG. 2I), in comparison with E30 (Ra=8.67 nm, FIG. 2J) and T30 (Ra=11.39 nm, FIG. 2K). Notably, at a volumetric printing speed of $1.25\times10^4$ $mm^3$ $h^{-1}$, the 3-mm-high AM30 was 3D printed in just 3 minutes.

Figure 6:
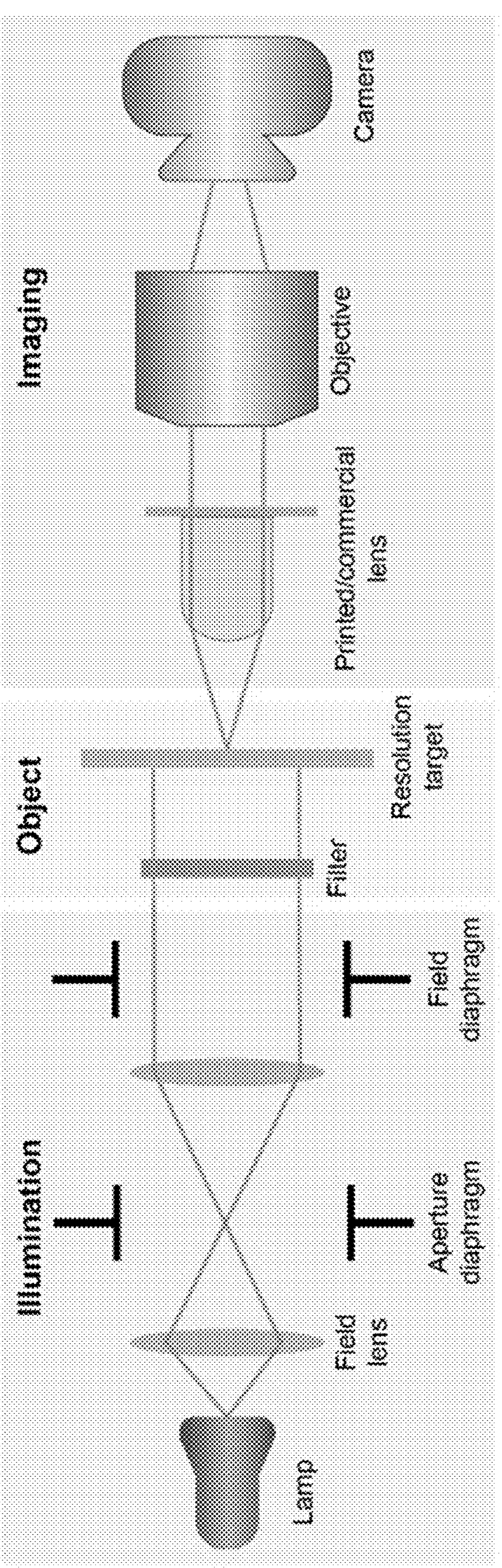
FIG. 6: Schematic of optical test system to characterize the imaging quality of printed lens.

We experimentally compared imaging resolution for all three lenses (FIG. 6). Captured images of the USAF 1951 resolution target illuminated with green light (λ=532 nm) for AM30, E30, and T30 are shown in FIGS. 2L, 2M and 2N, respectively. All three lenses exhibit a comparable imaging resolution capable resolving Element 3 of Group 7, corresponding to a 3.10-μm spatial resolution which optimizes the overall performance of the imaging system as the highest spatial frequency of the lens shall not exceed the Nyquist frequency of the CMOS sensor (OV09734-H16A, Omnivision) to avoid aliasing. Images acquired using E30 and T30 show relatively poor contrast, which might be correlated to the aforementioned structural defects found in FIGS. 2D-2E. Similar behavior is also observed under different illumination conditions (FIGS. 7A-7M). For the interest of customization, we also characterized the imaging resolution of AM43 with EFL of 4.3 mm (FIGS. 8A-8E).

Figures 3A, 3B:
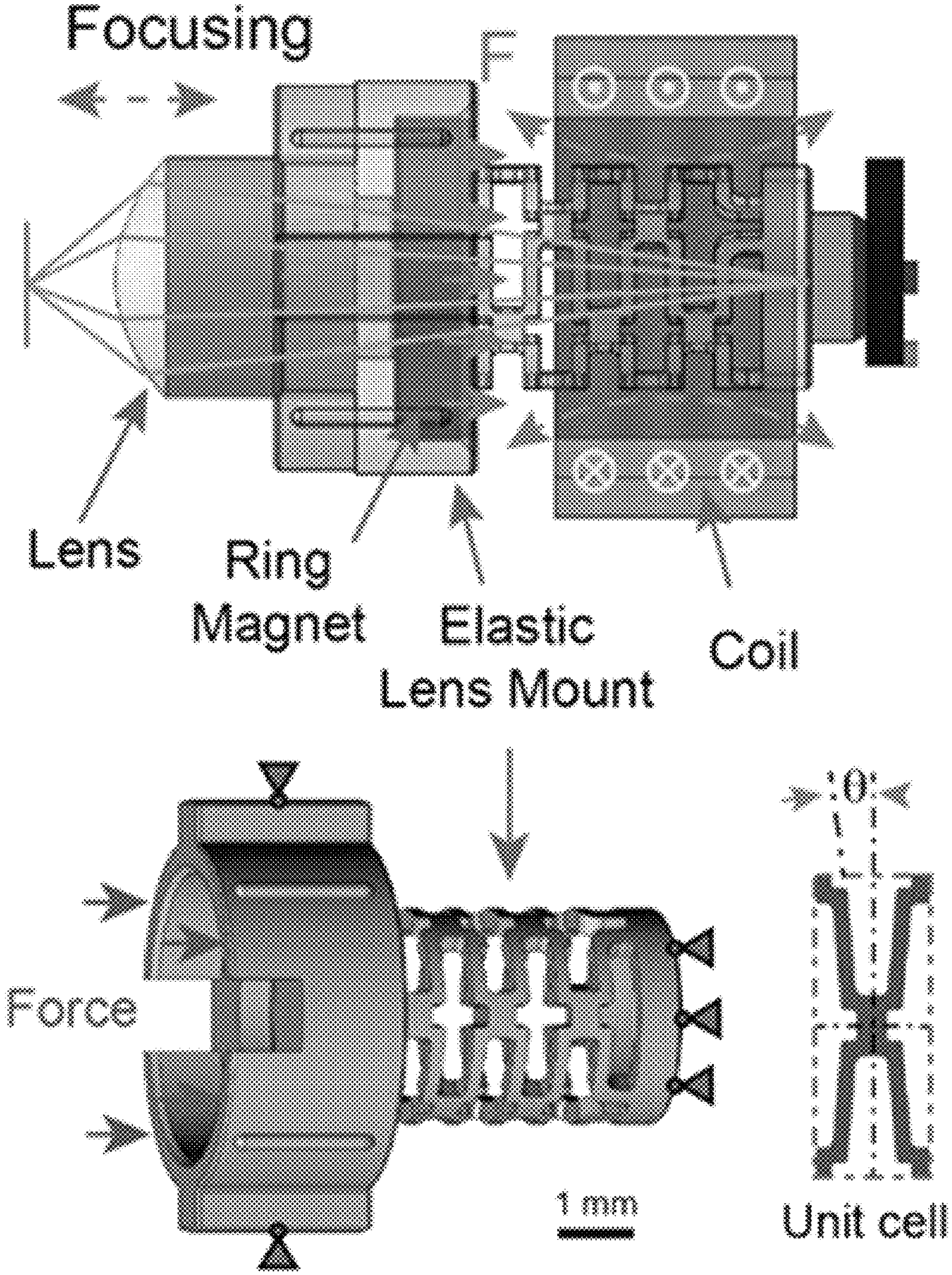
Figure 3F:
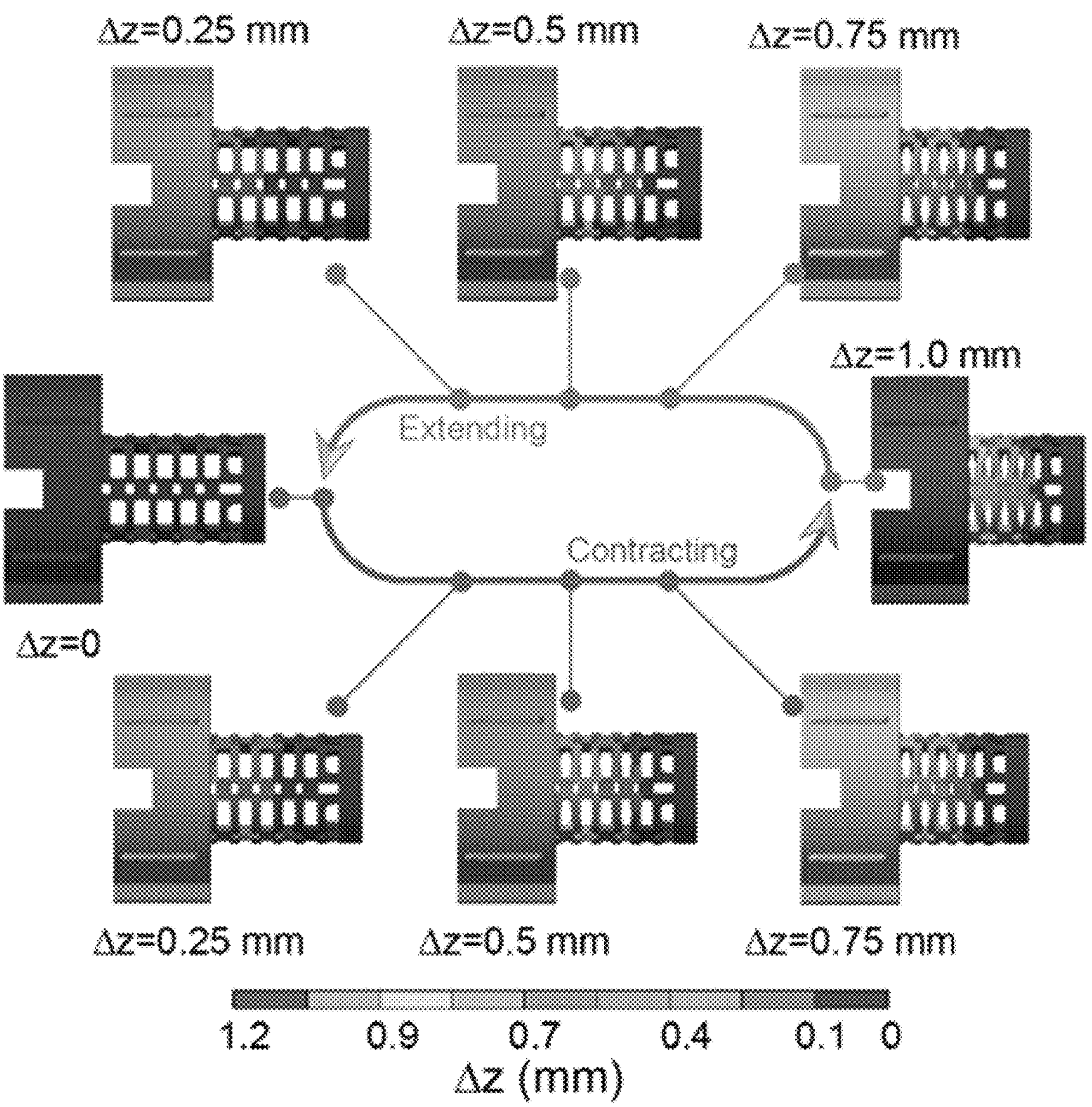

The VCM assembly (FIG. 3A) was designed to focus the imaging lens through electromagnetic actuation. It contains an electromagnetic coil, a ring magnet, a compliant foundation, and the imaging lens mount. The components were carefully designed to ease the assembly process. To better illustrate the assembly process, relative positions of elastic lens mount, lens, ring magnet and coil are illustrated in FIG. 3A. The elastic lens mount consists of three components: lens mount, ring magnet mount, and compliant foundation from top to bottom, as shown in FIG. 3B. Grooves on the top and at bottom of the mount were designed for mounting the lens and ring magnet, respectively. To allow for the use of tweezers during the assembly process, we designed the interspace on the top of the lens mount to provide clearance. Two large sliding blocks on the side of the mount correspond with the sliding rails in the upper shell, to calibrate the movement of the mount. Meanwhile, four half-cylinder lug bosses were designed to reduce friction during translating of the mount. We implement PCR design to integrate three distinct optomechanical components—lens mount, ring magnet mount, and compliant foundation—into a monolithic elastic lens mount. The axial translation of the imaging lens is determined by the balance between electromagnetic forces from the coil and magnet and resilient forces from the complaint foundation. FIG. 3B shows the boundary conditions used in a simulated compression test in ANSYS (details see Method). The primary design variable in the complaint foundation is the strut angle (8), which was varied between −4.5° to +10° (Inset, FIG. 3B). We optimize 8 to achieve sufficient axial deformation (>1.0 mm) while reducing radial deformation to minimize its interference during VCM actuation. An optimal 0° strut angle exhibits the lowest Poisson's ratio of 0.051, achieving a largest axial displacement of 1.17 mm (FIG. 3C). The fabricated compliant foundation demonstrated a highly linear behavior during compression testing (FIG. 3D), corroborating the numerical simulation. We further simulate the magnetic force (details in Experimental Section) that a N50 Neodymium ring magnet (R0545, SuperMagnetMan) bears as a function of axial distance and input voltage (FIG. 3E) obtained by a previously reported algorithm[40]. ANSYS simulation suggests that the force of 52.96 mN—an amount readily available from the coil/magnet over the designed displacement range—is required to reach the largest axial deformation of 1.17 mm, validating the feasibility of our proposed axial translation mechanism. The simulated displacement fields in the lens holder during the cyclic contracting and extending motion are predominantly translational along the optical axis (FIG. 3F).

Figure 1E:
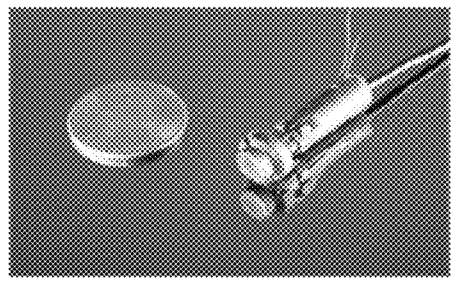
Figures 4A, 4B, 4C:
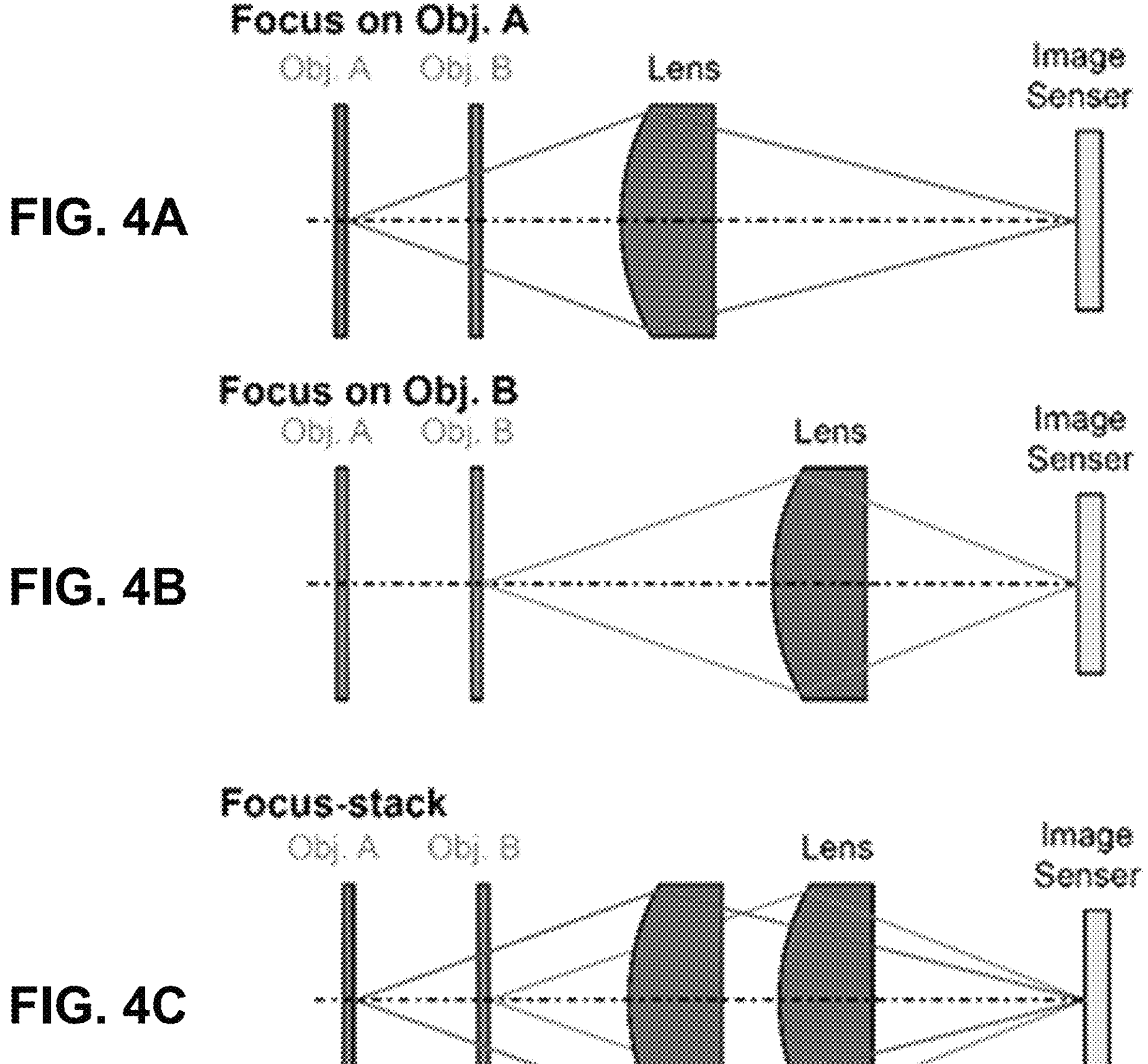

We experimentally validated the performance of the assembled miniaturized microscope using AM30 (FIG. 1E). The test objects used in this study are a pair of biological specimens (NEW-BRE1003, NOCOEX Company) indicated by object A and B in FIG. 1A that are spatially offset by 1.0 mm axially and 0.8-1.2 mm laterally. As the axial offset is greater than system DOF, we can actuate the VCM to translate the imaging lens to bring the desirable object in focus (FIGS. 4A-4B). The ability to axially scan the imaging lens further enable us to implement the focusing stack function to effectively extend the DOF (FIG. 4C). We used the pair of house fly labellum (object A) and honeybee barsitarsus (object B) specimens as test Case I. FIG. 4A illustrates the scenario where the VCM is used to bring object A in focus, while leaving object B out of focus. Only the network structure of the house fly labellum can be clearly resolved (FIG. 4D). The VCM can then translate the imaging lens backwards to acquire clear images of object B (FIG. 4E) and the recorded image is shown in FIG. 4D. A series of images can be acquired covering the axial positions of objects A and B and processed using the stack function in Adobe Photoshop with defaults settings. After focus-stacking, both objects are brought into focus simultaneously without any degradation compared with single frames, thereby extending system DOF (FIG. 4F). Similar tests were performed on test Case II (labial palp/honeybee barsitarsus) and test Case III (two pieces of onion epidermis) in FIGS. 4G-4I and 4J-4L, respectively. To demonstrate system customizability, we repeated the same tests using the miniaturized microscope assembled with E30 (FIGS. 10A-10I) and T30 (FIGS. 11A-11I). Although low apparent image contrast led to reduced focus stacking reconstruction fidelity, we successfully integrated optical components from different fabrication methods, demonstrating the benefits of the unified AM fabrication and PCR strategies reported.

In this study, we have established a unified AM process implementing PCR strategy and passive alignment features, which led to improved ease of assembly and overall cost savings for miniaturized imaging systems. The PCR strategy we employed consolidates the lens mount, ring magnet mount, and compliant foundation into a monolithic part, greatly reducing component manufacturing and assembly costs. The 3D printed passive alignment features further simplify system assembly, as all components snap-fit together without requiring any precise machinery for active alignment. Collectively, this leads to the demonstration of a miniature optical microscope at a unit cost of less than $4 without compromising performance or customizability. The 3D printed lens demonstrates a spatial resolution of 3.10 μm under 532 nm illumination, exhibiting a better contrast than its commercial counterparts. The assembled microscope employs an integrated VCM to focus the imaging lens on objects at different distances. Synergizing successive image acquisition and VCM actuation results in a greatly extended DOF through focus-stacking. The microscope can be readily customized and rapidly manufactured to respond to task-specific needs in imaging magnification and working distance. The capability to manufacture the system from a single resin provides an opportunity for this system to serve as an exemplar device, readily available to transform the novel materials developed by the materials research community into functional devices to demonstrate their advantages. This demonstrated flexibility associated with the digital manufacturing process enables this low-cost imaging platform to be readily customized and disseminated to broader user community as an open-source project and greatly expand the application scenario of AM.

Experimental Section

Magnetic Force Simulations. To calculate the magnetic force between the coil and the ring magnet, we adopted previously reported algorithms and code[40-41]. The thick coil, which has multiple radial turns $N_r$, is modeled as superposition of a group of coaxial thin coils which carry same current and have same number of axial turns Na. The ring magnet is modeled as a superposition of two cylindrical magnets carrying opposity magnetization, with their radii corresponding to the inner and outer radius of the ring magnet, respectively. The magnetic force exerted on a cylindrical magnet with radius $r_2$ by a thin coil with radius $r_1$ is given by equation EQ1[41]:

$$F = \frac{J_1 J_2}{2\mu_0} \sum_{i=1}^{2} \sum_{j=1}^{2} a_1 a_2 a_3 F_z (-1)^{i+j} \quad \text{(EQ 1)}$$

where the intermediate term is:

$$F_z = K(a_4) - \frac{1}{a_2} E(a_4) + \left(\frac{a_1^2}{a_3^2} - 1\right) \Pi\left(\frac{a_4}{1 - a_2} \mid a_4\right) \quad \text{(EQ 2)}$$

where K, E and Π are first, second and third elliptic integrals respectively. $J_1 = \mu_0 N_a I / l_c$ where I is the current and $l_c$ is the coil length; $J_2$ is the magnet remanence; $\alpha_1$ is the distance between the centers of mass of magnet and coil and other parameters are:

$$a_2 = \frac{(r_1 - r_2)^2}{a_1^2} + 1 \quad \text{(EQ 3)}$$

-continued $$a_3 = \sqrt{(r_1 + r_2)^2 + a_1^2} \quad \text{(EQ 4)}$$

$$a_4 = \sqrt{\frac{4 r_1 r_2}{(r_1 + r_2)^2 + a_1^2}} \quad \text{(EQ 5)}$$

We calculated equation EQ1 for a cylindrical magnet of $r_o$ with +z magnetization and for a cylindrical magnet of $r_i$ with −z magnetization, where $r_o$ and $r_i$ are outer and inner diameter of the ring magnet, respectively. The total magnetic force is then obtained by adding those two results together. The ring magnet we used in our simulations and experiments was a N50 Neodymium ring magnet (R0545, SuperMagnetMan) with a 3 mm inner diameter (ID) and a 4 mm outer diameter (OD). The coil was manufactured upon customization from WireWinders and has an ID of 4 mm, an OD of 6 mm and a wire diameter of 0.0799 mm (40 AWG). The heights of the ring magnet and coil are 1 mm and 3 mm respectively.

Lens Mount ANSYS Simulations. Lens mount designs were input into ANSYS and given a mesh of 64,100 nodes and 35, 132 linear elements, typically. As-Printed HDDA (no-UV flood exposure) was given a Young's Modulus of 171.85 MPa, Yield Strength of 6.7 MPa, and UTS of 18.04 MPa, with Poisson's ratio of 0.3. Loadings and constraints are shown in FIG. 3A, which were applied to all models. Frictionless supports were applied to the base of the design and the largest diameter faces of the top portion of the lens mounts. An applied loading meant to simulate magnetic actuation is applied on the top surface (FIG. 3A). The Force loading was ramped up from 0 to 60 mN, which produced the desired axial displacements before the struts contact each other. Noted deformations are the radial deformation and the axial deformation and the ratio of radial and axial (R/A, Design Relation Poisson's ratio). Shown in FIG. 3B are the largest axial deformation and Poisson's ratio with respect to applied force (ANSYS) for designs with different strut angles. Max R/A (design-related Poisson's Ratio) of the system was determined either at the maximum applied force (F=60 mN) or when the struts came into contact with one another (F<60 mN).

Ellipsometry Measurement. A thin film of photocurable resin was cured as for use as an ellipsometry sample to obtain its wavelength-dependent refractive index. The thin film was made by casting the photocurable resin onto a piece of glass slide which was partly covered by a layer of palladium (100 nm). Then another piece of glass slide used to cover the former one and peeled off after the photocurable resin is cured. The palladium layer here serves as a spacer to offer us a thin, repeatable film of photocurable resin with a desired thickness. The wavelength-dependent refractive index was measured by using a spectroscopic ellipsometer (M2000U, J. A. Woollam Co.) using the reflection mode. The spectroscopic ellipsometry (SE) method measures the complex reflectivity comprising reflection ratio Ψ and phase difference Δ. The SE data analysis process begins by constructing parametrized layered optical model which corresponds to the sample structure. Each layer of the sample is parametrized by its thickness and optical constants. The retrieval process simultaneously determines the complex refractive index and the thickness of each of the constituting layers. The original data were obtained at incident angles from 55° and 75° with an interval of 5° and were further fitted with Cauchy-film model.

Optimization of Aspherical Surface. The surface profile of the aspherical lens was designed and optimized for minimizing spherical aberration and image distortion under 632.8 mm (Design 1) and 532 nm (Design 2) illumination, respectively. Their surface profiles are defined by following equation EQ6:

$$z(r)=\frac{r^2}{R\left[1+\sqrt{1-(1+\kappa)\frac{r^2}{R^2}}\right]}+\alpha_4 r^4+\alpha_6 r^6 \tag{EQ 6}$$

where R is the radius of curvature (in millimeter), $\kappa$ is the conic constant, $\alpha_4$ and $\alpha_6$ are the aspherical coefficients, respectively. The optimized parameters for lens design 1 are R=2.980, $\kappa$=−0.699, $\alpha_4$=1.526×10$^{-3}$ and $\alpha_6$=−9.162×10$^{-4}$, respectively. The optimized parameters for lens design 2 are R=2.011, $\kappa$=0, $\alpha_4$=−0.017 and $\alpha_6$=−7.855×10$^{-3}$.

REFERENCES CORRESPONDING TO EXAMPLE 1A

1 Aharoni, D. & Hoogland, T. M. Circuit investigations with open-source miniaturized microscopes: past, present and future. *Frontiers in cellular neuroscience* 13, 141 (2019).

2 Cybulski, J. S., Clements, J. & Prakash, M. Foldscope: origami-based paper microscope. *PloS one* 9, e98781 (2014).

3 Sigal, I. et al. Imaging brain activity during seizures in freely behaving rats using a miniature multi-modal imaging system. *Biomedical Optics Express* 7, 3596-3609 (2016).

4 Assefa, B. G. et al. Imaging-quality 3D-printed centimeter-scale lens. *Optics express* 27, 12630-12637 (2019).

5 Chen, X. et al. High-Speed 3D Printing of Millimeter-Size Customized Aspheric Imaging Lenses with Sub 7 nm Surface Roughness. *Adv Mater* 30, e1705683, doi: 10.1002/adma.201705683 (2018).

6 Dylla-Spears, R. et al. 3D printed gradient index glass optics. *Science* advances 6, eabc7429 (2020).

7 Gawedzinski, J., Pawlowski, M. E. & Tkaczyk, T. S. Quantitative evaluation of performance of three-dimensional printed lenses. *Optical engineering* 56, 084110 (2017).

8 Shao, G., Hai, R. & Sun, C. 3D Printing Customized Optical Lens in Minutes. *Advanced Optical Materials* 8, doi:10.1002/adom.201901646 (2019).

9 Zhang, Y., Wu, L., Zou, M., Zhang, L. & Song, Y. Suppressing the Step Effect of 3D Printing for Constructing Contact Lenses. *Advanced Materials* 34, 2107249 (2022).

10 August, I., Oiknine, Y., AbuLeil, M., Abdulhalim, I. & Stern, A. Miniature compressive ultra-spectral imaging system utilizing a single liquid crystal phase retarder. *Scientific reports* 6, 1-9 (2016).

11 Wang, C. Y. & Wang, P. J. Analysis of optical properties in injection-molded and compression-molded optical lenses. *Applied optics* 53, 2523-2531 (2014).

12 Tsai, K.-M. Effect of injection molding process parameters on optical properties of lenses. *Applied Optics* 49, 6149-6159 (2010).

13 Zhang, L. & Liu, W. Precision glass molding: Toward an optimal fabrication of optical lenses. *Frontiers of Mechanical Engineering* 12, 3-17 (2017).

14 Duda, T. & Raghavan, L. V. 3D Metal Printing Technology. *Ifac Papersonline* 49, 103-110, doi:10.1016/j.ifacol.2016.11.111 (2016).

15 Kawata, S., Sun, H. B., Tanaka, T. & Takada, K. Finer features for functional microdevices—Micromachines can be created with higher resolution using two-photon absorption. *Nature* 412, 697-698, doi:Doi 10.1038/35089130 (2001).

16 Martin, J. H. et al. 3D printing of high-strength aluminium alloys. *Nature* 549, 365-369, doi:10.1038/nature23894 (2017).

17 MacDonald, E. & Wicker, R. Multiprocess 3D printing for increasing component functionality. *Science* 353, aaf2093 (2016).

18 Savastano, M., Amendola, C. & Massaroni, E. in *Digitally supported innovation* 2016).

19 Lecklider, T. 3D printing drives automotive innovation. *EE-Evaluation Engineering* 56, 16-20 (2017).

20 Ichida, Y. Current Status of 3D Printer Use among Automotive Suppliers: Can 3D Printed-parts Replace Cast Parts. *IFEAMA SPSCP* 5, 69-82 (2016).

21 Shapiro, A. A. et al. Additive manufacturing for aerospace flight applications. *Journal of Spacecraft and Rockets,* 952-959 (2016).

22 Kobryn, P., Ontko, N., Perkins, L. & Tiley, J. Additive manufacturing of aerospace alloys for aircraft structures. (Air Force Research Lab Wright-Patterson AFB OH Materials and Manufacturing . . . , 2006).

23 Dehoff, R. et al. Case study: additive manufacturing of aerospace brackets. *Advanced Materials & Processes* 171, 19-23 (2013).

24 Popov, V. V. et al. Design and 3D-printing of titanium bone implants: brief review of approach and clinical cases. *Biomedical engineering letters* 8, 337-344 (2018).

25 Tetsuka, H. & Shin, S. R. Materials and technical innovations in 3D printing in biomedical applications. *Journal of Materials Chemistry B* 8, 2930-2950 (2020).

26 Yu, C. et al. Photopolymerizable biomaterials and light-based 3D printing strategies for biomedical applications. *Chemical reviews* 120, 10695-10743 (2020).

27 Cruz, P. J., Knaack, U., Figueiredo, B. & Witte, D. d. in *Proceedings of IASS Annual Symposia.* 1-10 (International Association for Shell and Spatial Structures (IASS)).

28 Rael, R. & San Fratello, *V. Printing architecture: Innovative recipes for 3D printing*. (Chronicle Books, 2018).

29 Yang, S. & Zhao, Y. F. Additive manufacturing-enabled part count reduction: a lifecycle perspective. *Journal of mechanical design* 140 (2018).

30 Gissibl, T., Thiele, S., Herkommer, A. & Giessen, H. Sub-micrometre accurate free-form optics by three-dimensional printing on single-mode fibres. *Nat Commun* 7, 11763, doi:10.1038/ncomms11763 (2016).

31 Gissibl, T., Thiele, S., Herkommer, A. & Giessen, H. Two-photon direct laser writing of ultracompact multi-lens objectives. *Nature Photonics* 10, 554-560, doi: 10.1038/nphoton.2016.121 (2016).

32 Toulouse, A. et al. Ultra-compact 3D-printed wide-angle cameras realized by multi-aperture freeform optical design. *Optics Express* 30, 707-720 (2022).

33 Li, J. et al. 3D-Printed Micro Lens-in-Lens for In Vivo Multimodal Microendoscopy. *Small,* 2107032 (2022).

34 Biehl, S., Danzebrink, R., Oliveira, P. & Aegerter, M. A. Refractive microlens fabrication by ink-jet process. *Journal of Sol-Gel Science and Technology* 13, 177-182, doi:10.1023/a:1008648615758 (1998).

35 Groet, G. in *SPIE AVR*21 *Industry Talks II.* 117640F (International Society for Optics and Photonics).

36 van Lith, R. et al. 3D-Printing Strong High-Resolution Antioxidant Bioresorbable Vascular Stents. *Advanced Materials Technologies* 1, doi:10.1002/admt.201600138 (2016).
37 Tumbleston, J. R. et al. Additive manufacturing. Continuous liquid interface production of 3D objects. *Science* 347, 1349-1352, doi:10.1126/science.aaa2397 (2015).
38 Toombs, J. T. et al. Volumetric additive manufacturing of silica glass with microscale computed axial lithography. *Science* 376, 308-312 (2022).
39 Collins, J. T. et al. Robotic microscopy for everyone: the OpenFlexure microscope. *Biomedical Optics Express* 11, 2447-2460 (2020).
40 Robertson, W., Cazzolato, B. & Zander, A. Axial Force Between a Thick Coil and a Cylindrical Permanent Magnet: Optimizing the Geometry of an Electromagnetic Actuator. *IEEE Transactions on Magnetics* 48, 2479-2487, doi:10.1109/tmag.2012.2194789 (2012).
41 Robertson, W., Ravaud, R., Cazzolato, B., Zander, A., A Simplified Force Equation for Coaxial Cylindrical Magnets and Thin Coils. *IEEE Transactions on Magnetics* 47, 2045-2049, doi:10.1109/TMAG.2011.2129524 (2011).

Example 1B: Supplementary Information

1. μCLIP System

Figure 5A:
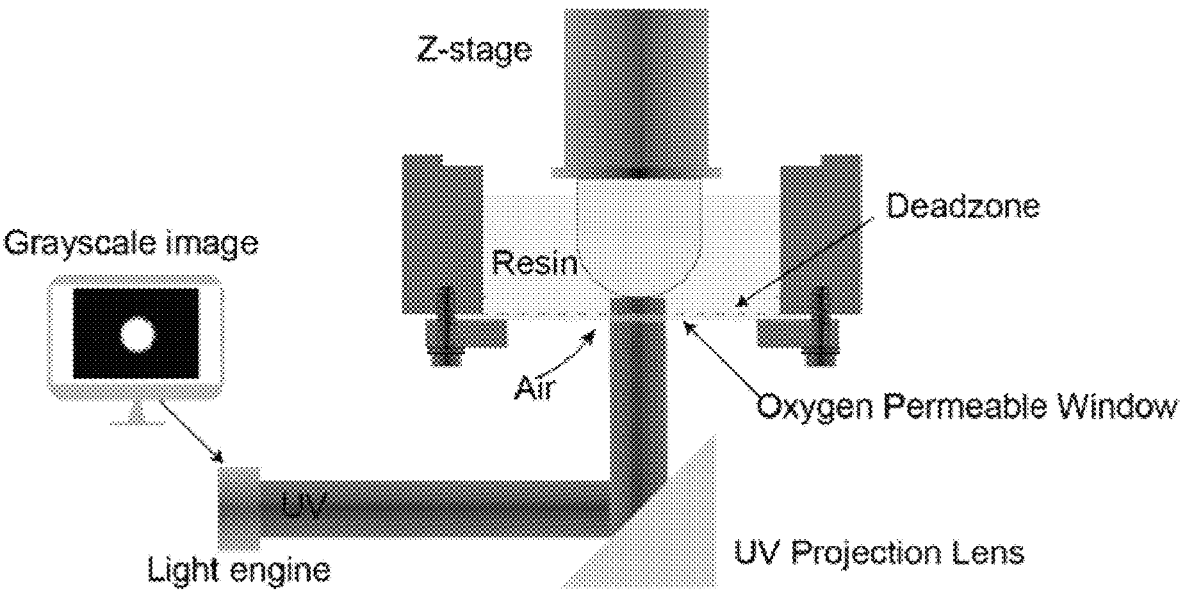
FIG. 5A: Schematic of certain functional components of micro-Continuous Liquid Interface Production (μCLIP) 3D printing system.
Figure 5B:
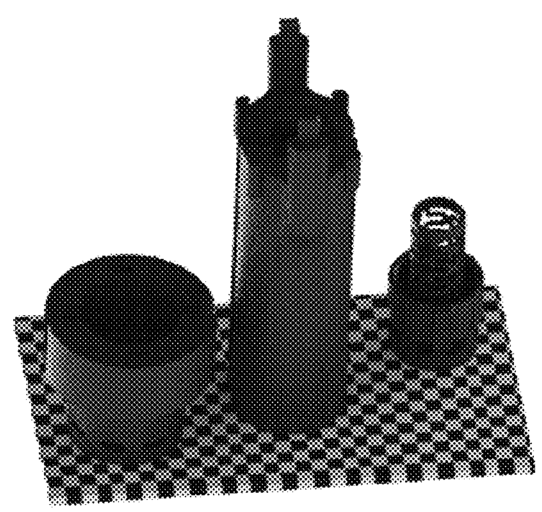
FIG. 5B: Configuration of mechanical components on the printing bed for the unified printing.
Figure 5C:
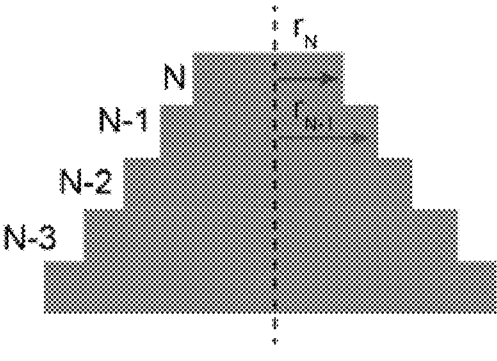
FIG. 5C: Schematic of slicing layers.
Figure 5D:
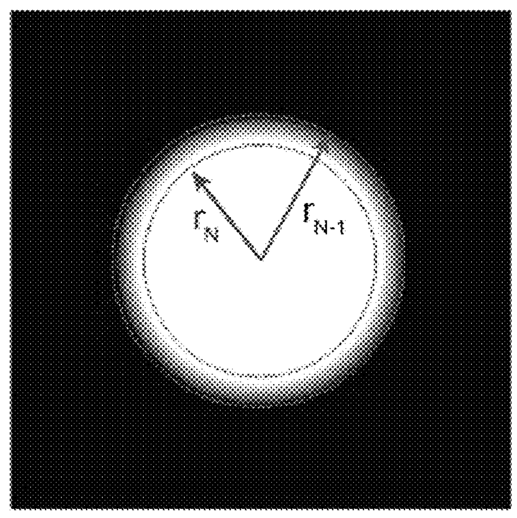
FIG. 5D: Schematic illustration of grayscale interpolation.
Figure 5D:
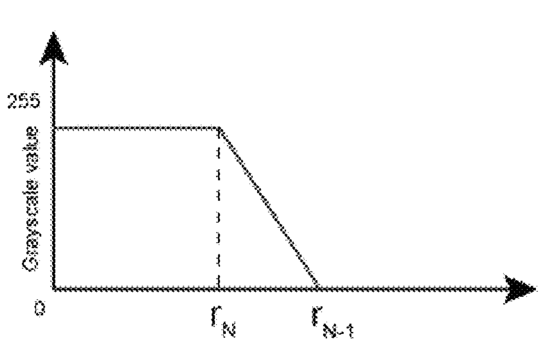

This homemade μCLIP system consists of a computer for movement and projection control, a digital micromirror device (DMD) light engine (Pro 6600, Wintech Digital Systems Technology Corp.) featuring 4K resolution (3860×2160 pixels) and 385 nm UV light source, an ultraviolet (UV) projection lens (UV8040BK2, Universe Kogaku America Inc.), a resin container (installed with a piece of PDMS/Teflon membrane as oxygen permeable window) and a building stage controlled by a six-axis robotic arm (Meca500, Mecademic). As shown in FIG. 5A, the grayscale image of each fabrication layer is loaded to the DMD light engine and the pattern is projected via UV light (λ=385 nm) into the liquid resin from below. The oxygen will diffuse through the membrane and create a so-called "deadzone" at the vicinity of the membrane, where the free radical polymerization is substantially inhibited by the oxygen. This prevents adhesion while maintaining the supply of fresh resin as the printed structure being pulled up continuously in z-direction. The light engine used in our experiment features a power density up to 30.33 mW $cm^{-2}$, with a projection area of 19.3×10.8 $mm^2$ and a high spatial resolution of 5×5 $\mu m^2$ $pixel^{-1}$.

2. Slicing and Grayscale Algorithm

The CAD models presented in this study are first processed by a slicing algorithm used in our previous work. The CAD model is first as saved in STL (Standard Triangular Language) format, as the vertex positions can be extracted from it as an array consisting of coordinates in x, y and z axis. A sequence of coordinates in z-axis, corresponding to each layer, can be determined by the layer thickness and the height of object. The cross-sections corresponding to the z-coordinates of the 3D object can be extracted and stored as binary bitmap images. For layers with changing radius (FIG. 5C), the grayscale profile is determined by the interpolation of the adjacent layers (FIG. 5D) to provide a smoother intensity profile between neighboring layers. The grayscale bitmaps were loaded into the light engine to serve as dynamic masks.

3. Determination of Printing Parameters

Printing parameters were determined by the speed-working curing method. The curing depth of photocurable resin can be expressed as:

$$C_d = A - D_p \times \ln(v_s) \tag{EQ7}$$

where $C_d$ is the curing depth, A is a constant of length unit determined by the combination of photocurable resin and the wavelength of projected data, $D_p$ is the penetration depth of the projected UV light and vs is the building plate moving speed. In μCLIP technique, a "deadzone" exists at the vicinity of oxygen permeable window where the photopolymerization is prohibited. The "deadzone" thickness $D_z$ should be reduced from the theoretical curing depth in Equation EQ7 to obtain the actual curing depth:

$$C_d = (A - D_z) - D_p \ln(v_s) \tag{EQ8}$$

To determine the printing speed which creates the desired curing depth, we fixed the projected UV power density to 3.17 mW/$cm^2$. A ladder-shape model with beam thickness of 100 μm was printed at 10.00 μm/s, 11.11 μm/s, 12.50 μm/s, 14.29 μm/s, 16.67 μm/s and 20.00 μm/s. The printed beam thickness was measured by SEM and fitted into Equation EQ8 together with printing speeds to obtain the desired printing speed.

4. Printing Process of Imaging Lens

The clear resin used for an aspherical lens consists of 97.3 wt. % HDDA (Sigma-Aldrich Inc.) as low-viscosity monomer, 2.2 wt. % Irgacure 819 (BASF Inc.) as photoinitiator and 0.5 wt. % Tinuvin 171 (BASF Inc.) as UV absorber. The chemicals were mixed and stirred by ultrasonic for 1 hour to obtain the photocurable resin. The exposure time for each 1-μm fabrication layer is 0.06 s, with an intensity of 3.63 mW $cm^{-2}$. The imaging lenses were printed at a linear printing speed of 16.67 μm/s. After printing, a meniscus coating process was performed for the imaging lenses to consume the residual resin and form a continuous lens profile. The residual resin was partially removed by placing delicate task wipers (Kimtech Science Kimwipes 34155, Kimberly-Clark Inc.) near the bottom of the printed lens to absorb the remaining resin. The samples were then stored in a transparent sample box, which was filled by $N_2$, and post cured in UV light (365 nm) for 5 min with an intensity of 74.75 mW $cm^{-2}$.

5. Image Tests Setup and Process for Lens

FIG. 6 shows a schematic illustration of the experimental setup. A United States Air Force (USAF) 1951 resolution target was used as the test object to characterize the spatial resolutions and modulation transfer functions (MTFs) of 3D printed lenses as well as the commercial lenses. The images formed by the 3D printed lens were collected by a 10× objective lens (UPLFLN10X2, Olympus Corporation of Americas) and then projected to a complementary metal-oxide-semiconductor (CMOS) camera (EO-5012M MONO LE, Edmund Optics). Bandpass filters with different center wavelengths at 488, 532, 632.8 nm were used to provide blue, green and red illuminations, respectively. This setup was primarily used to test the standalone performance of different lenses. When testing their performances on endoscope, the "Imaging" part was substituted by the integrated endoscope; the "Object" part was replaced by biological samples without the bandpass filters.

Figures 7A, 7B, 7C, 7D, 7E, 7F, 7G, 7H, 7I:
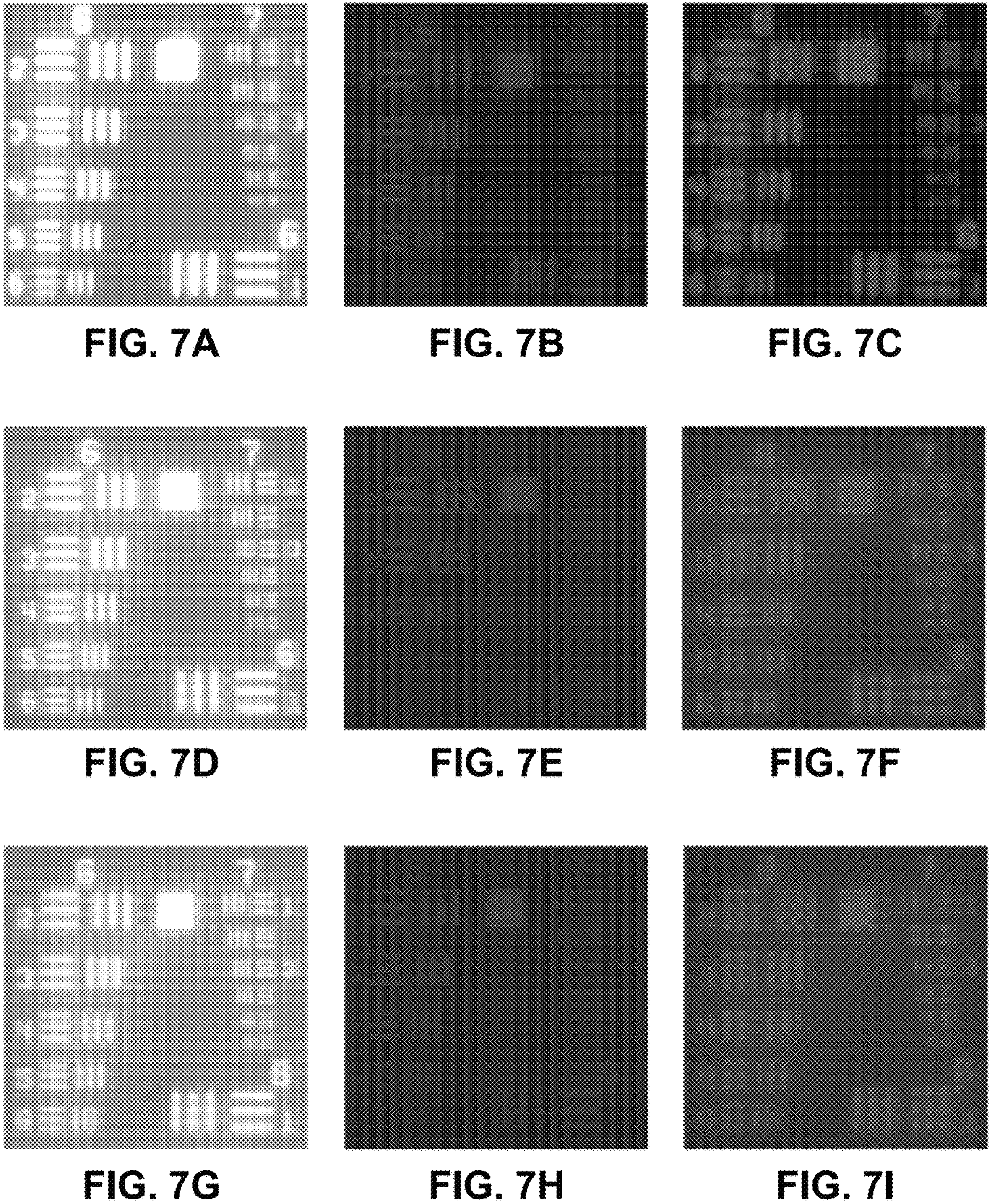
FIGS. 7A-7C: Images acquired by 3D printed aspherical lens from USAF 1951 resolution target under broadband, 488 nm (blue) and 632.8 nm (red) illuminations, respectively.
FIGS. 7D-7F: Images acquired from the same target by molded acrylic aspherical lens from Thorlabs, Inc. (APL0303, Thorlabs, Inc.) under broadband, 488 nm and 632.8 nm illuminations, respectively.
FIGS. 7G-7I: Images acquired from the same target by plastic aspherical lens (15-271, Edmund Optics).
Figure 7J:
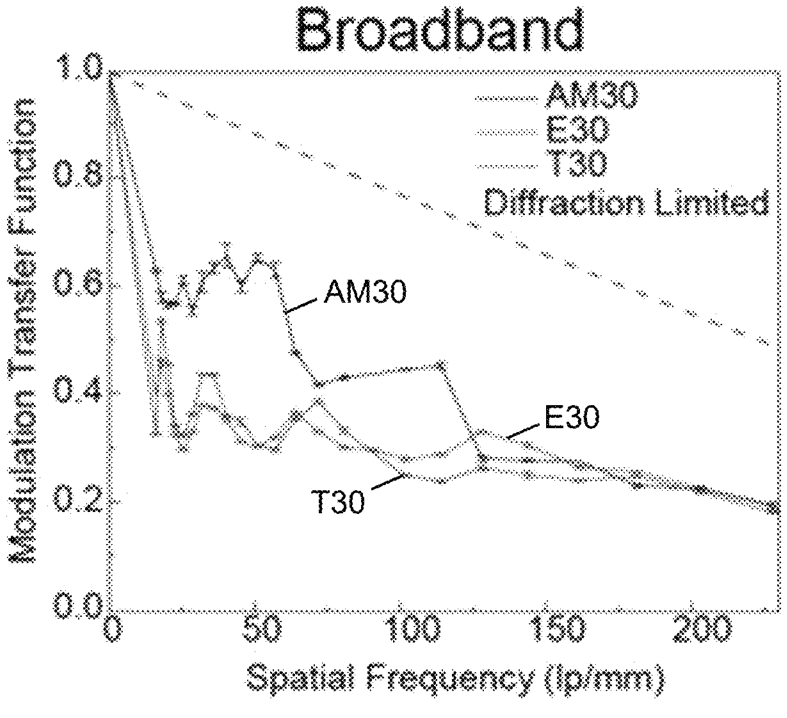
FIGS. 7J-7M: Measured modulation transfer functions (MTFs) of 3D printed lens and two commercial polymer lenses under (FIG. 7J) broadband illumination, (FIG. 7K) 488 nm (blue light) illumination, (FIG. 7L) 532 nm (green light) illumination and (FIG. 7M) 632.8 nm (red light) illumination. The black dotted lines are diffraction limited MTFs under corresponding illuminations.
Figure 7K:
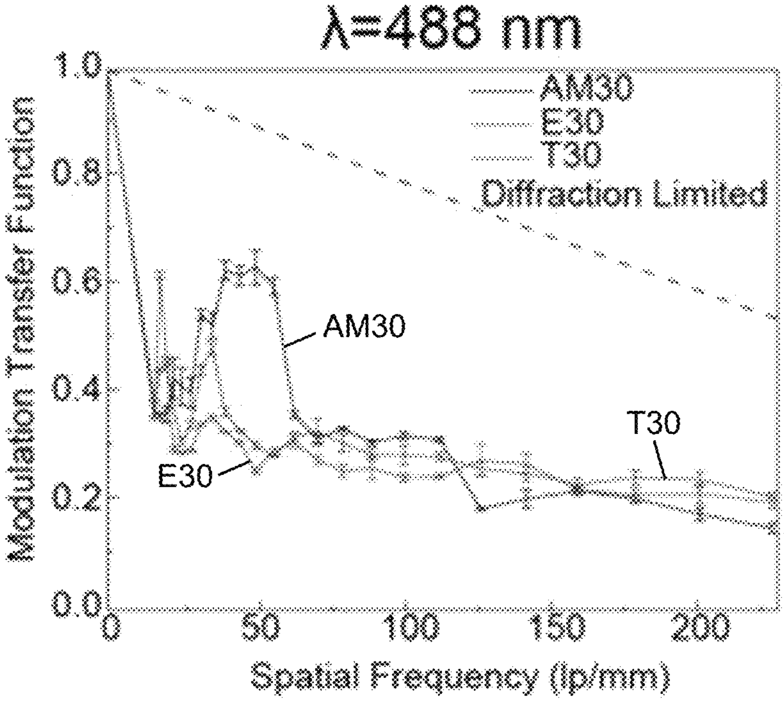
Figure 7L:
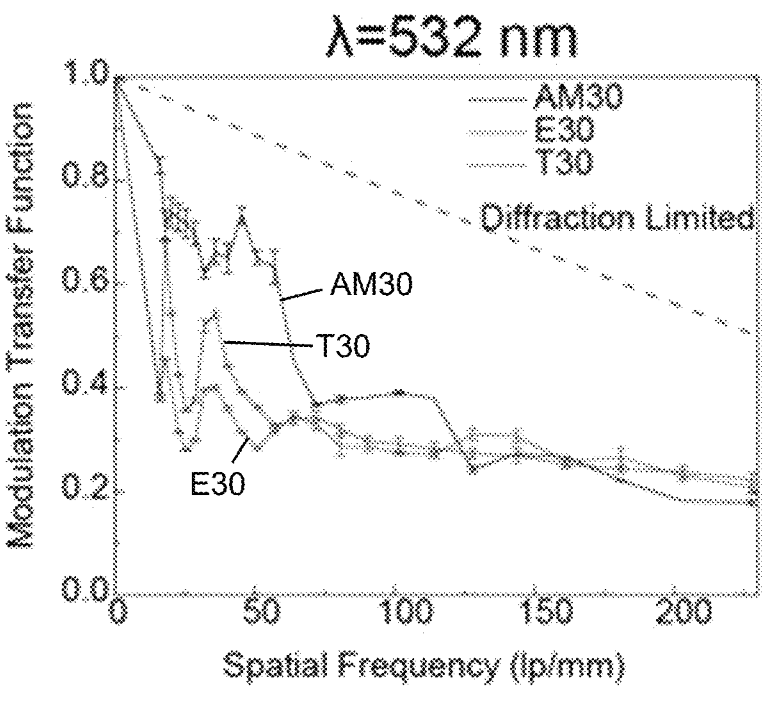
Figure 7M:
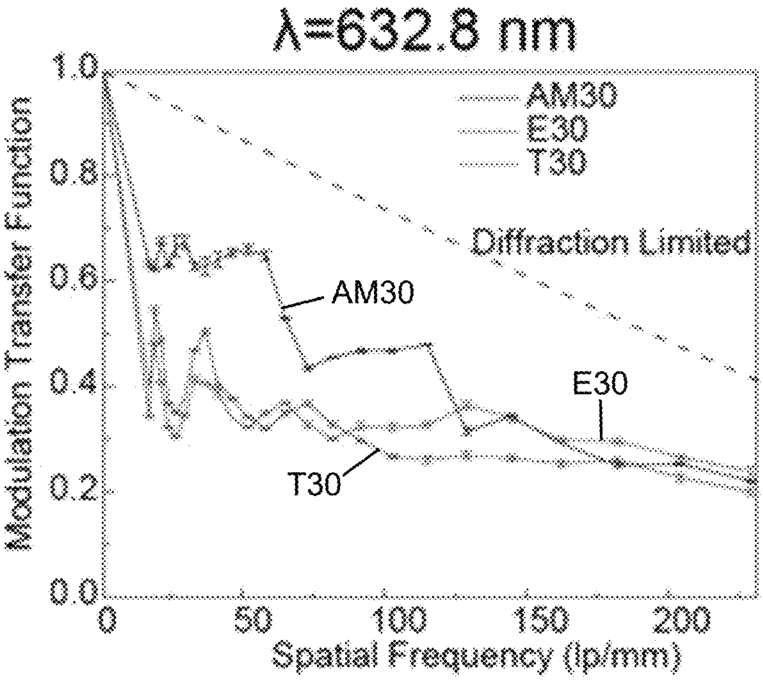

FIG. 7A demonstrates the frame captured by AM30 under broadband illumination, which shows distinctive chromatic aberration as the linewidths are larger than that of blue light illumination (λ=488 nm, FIG. 7B) and red illumination (λ=632.8 nm, FIG. 7C). Though chromatic aberration can be readily corrected under blue light illumination (FIG. 7B) and red illumination (FIG. 7C), the frames captured show a lower spatial resolution as the lens was optimized for green light illumination (FIG. 7L). However, 3D printed lens demonstrates comparable spatial resolution and better contrast compared with commercial polymer lenses (E30 and T30) under all illumination conditions (FIGS. 7D-7I). The imaging results further confirms the fabrication precision of 3D printed lens. The measured modulation transfer functions (MTFs) under different illuminations are depicted in FIGS. 7J-7M, diffraction limited MTFs are also plotted as references in these figures. Measured MTFs are calculated by following equation:

$$M = \frac{I_{max} - I_{min}}{I_{max} + I_{min}} \tag{1}$$

where M is the function value, $l_{max}$ and $l_{min}$ are the pixel values of the brightest pixel and darkest pixel within a particular element, respectively.

The measured MTFs are extracted from FIG. 7A to FIG. 71 and FIGS. 2L to 2N for each lens under different illuminations. Each data point represents the averaged value obtained from 5 bright-dark pairs of data points extracted within each element corresponding to different spatial frequencies. The 3D printed lens shows best resolution under green illumination for most of the spatial frequencies. The 3D printed lens also shows a consistently higher performance than commercial polymer lenses in the spatial frequency range of 32 to 128 lp/rm. It is worth to note that the performance of 3D printed lens is still comparable to that of commercial polymer lenses for higher spatial frequencies even in the case of blue illumination shown in FIG. 7K, where 3D printed lens has the worst overall performance along the measured spatial frequency range. Our experiments validated the performance of additive manufactured optical components against its commercial counterparts, which paves the way for the birth of the proposed 3D printed optomechanical system.

FIGS. 8A-8E show the imaging results of 3D printed aspherical lens following another Even Surface formula (AM43). The aspherical surface was optimized for red illumination. FIG. 8A demonstrates the image acquired by 3D printed lens under red illumination (632.8 nm) and it shows the lens can distinguish the fine features of Element 5 Group 7, which corresponds to a spatial resolution of 2.46 μm, on USAF resolution target. Though the lens performance is relatively poor under blue illumination (FIG. 8D), it still preserves spatial resolution comparable to commercial polymer lenses under broadband (FIG. 8C) and green (FIG. 8E) illuminations. The measured MTF under different illuminations shown in FIG. 8B further confirms the observation about the imaging results as MTF under blue illumination is the first one to drop below the value of 0.2, while other MTFs show relatively higher values. The imaging results presented here further validates the flexibility of our 3D printing system and paves the way to the fabrication of highly customized optical components.

6. Printing Process of Optomechanical Components

The opaque resin used for the mechanical elastic lens holder, and the lower and upper shells consist of 97.3 wt. % HDDA (Sigma Aldrich Inc.), 2.2 wt. % Irgacure 819 (BASF Inc.) and 0.5 wt. % Sudan Black I as dye. The chemicals were mixed and stirred by ultrasonic for 1 hour to obtain the photocurable resin. All the optomechanical components are loaded onto the printing bed simultaneously and printed in a single batch (FIG. 5B) to reduce the fabrication time. They were fabricated with a 5-μm layer thickness and an exposure time per layer of 0.6 s, with an intensity of 8.60 mW cm-2. After printing, the printed parts were rinsed in ethanol to wash off the residual resin and were dried with air.

7. Assembly Process of Miniature Microscope

Sub-components of the microscope are assembled and then integrated into the final assembly. Front cap, lens assembly and clamshells are assembled as subsystems shown in FIG. 1D. Mating features (green arrows) on each component assist alignment during assembling. UV epoxy (NOA81, Norland Products) was applied (areas designated with red dots in FIG. 1B) and cured with UV illumination (365 nm, 56 mW $cm^{-2}$) for 20 seconds to ensure secure attachment. No additional alignment processes or equipment is needed for the installation. The VCM was assembled by first inserting the coil between the contact structures on the clamshells and fixed by UV epoxy applied at the highlighted areas (red dots). The assembled elastic lens mount was then inserted into the coil tube. The embedded grooves on the front cap will fix its alignment and rotation with respect to the clamshells. The gap between two hem i-circular skirts will fix the position of the elastic lens mount by trapping the contact features on the side walls of the lens holder. Finally, UV epoxy was applied at highlighted areas on the outer body of the microscope to finalize the assembly and the experimentally assembled microscope is shown in FIG. 1E.

8. Imaging Tests and Image Processing for Assembled Microscope

Imaging tests with biological specimens were performed using miniature microscopes assembled with AM30, E30 and T30 for comparison and focus stacking. The experimental setup is the same as shown in FIG. 6. However, the filter was removed to provide broadband illumination and the "Imaging" section was replaced by the assembled microscope. The assembled microscope was fixed on the objective bases on a microscope (Olympus IX81). Three different combinations of biological samples were used as imaging objects: housefly labellum/honeybee barsitarsus (Case I), housebee glossae/honeybee barsitarsus (Case II) and two pieces of onion epidermis (Case III). In each case, the two samples were separated 1.0 mm vertically and 0.8-1.2 mm horizontally. The miniature microscope was first brought into focus on one of the samples by tuning the knob of the microscope. Then we turn on the power supply connected to the coil to provide magnetic force and use the VCM to scan the lens axially. A scan cycle records the focusing on object A, focus changing from object A to object B and focusing back on object A. Real time captured videos consist of several scan cycles for three lenses imaging different cases are found in Video S1-S3 (AM30), S4-S6 (E30), and S7-S9 (T30), respectively. Frames for focus stacking are randomly chosen from a single scan cycle and are used for focus stacking after color correction described in FIGS. 9A-9D. A background image (FIG. 9A) without any object was taken using the experimental setup described above. In FIG. 9A, the vignetting on CMOS sensors is clearly shown on the corners and borders of the figure. The average RGB values are calculated from the central region (red dotted box in FIG. 9A) and used as standard RGB values. Element-wise difference between the standard RGB values and RGB values on each pixel of the background image are calculated and resulted in the color mask shown in FIG. 9B. For each original image extracted from the videos, the color mask was subtracted from them as shown in FIG. 9C. The aforementioned color shift can also be observed from the image shown in FIG. 9C. After color correction, FIG. 9D shows the color corrected image in which no significant color shift is observed.

Figure 10A:
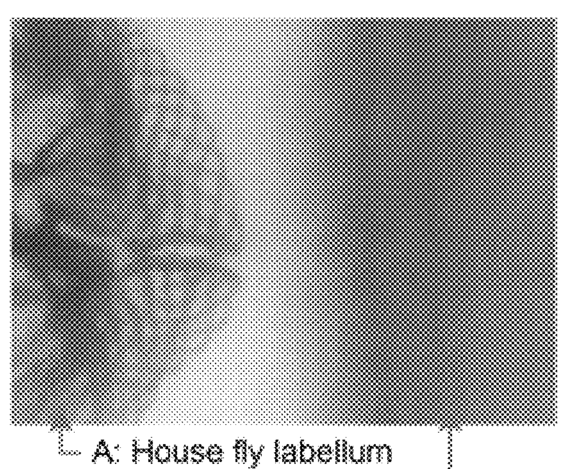
FIGS. 10A-10I: Focus stacking results of 3D printed microscope installed with E30. Case I.
Figure 10B:
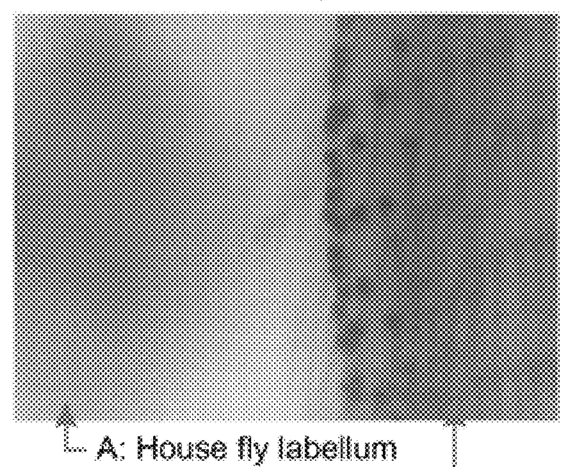
Figure 10C:
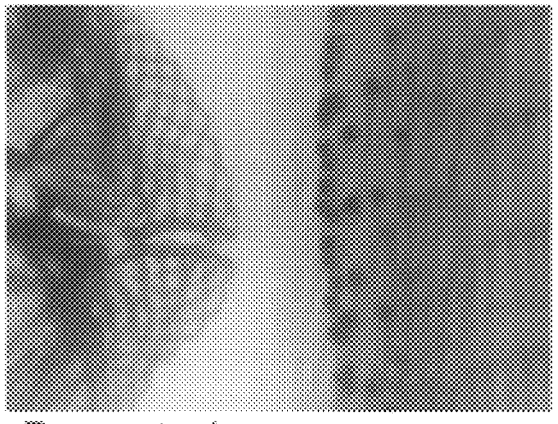
Figure 10D:
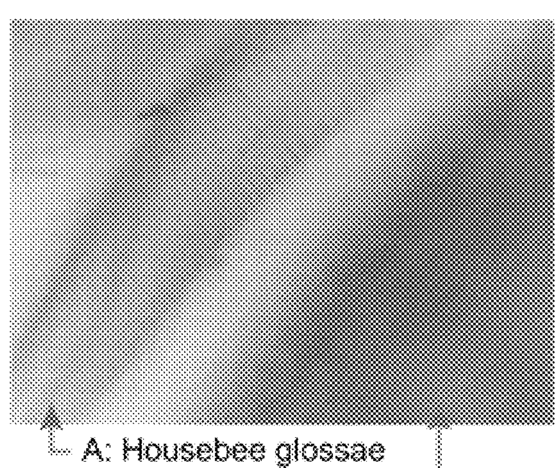
Figure 10E:
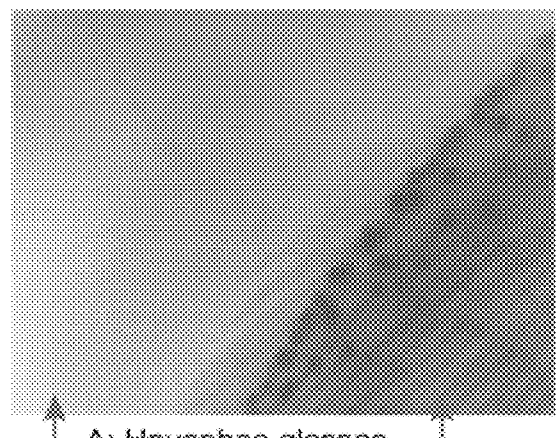
Figure 10F:
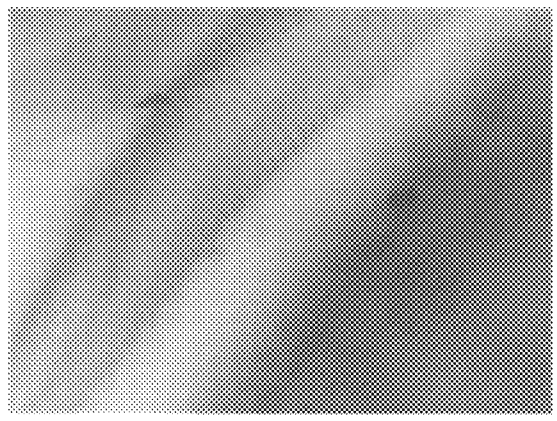
Figure 10G:
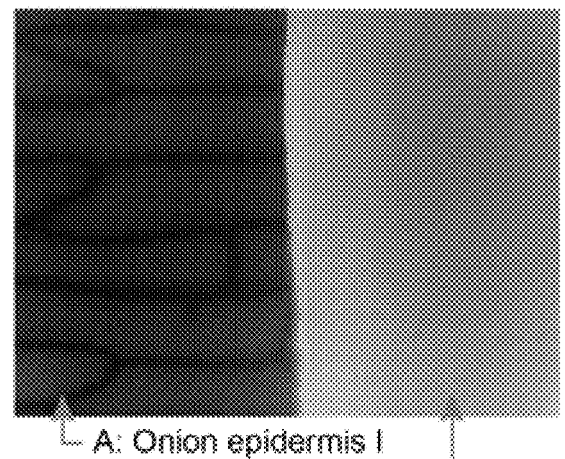
Figure 10H:
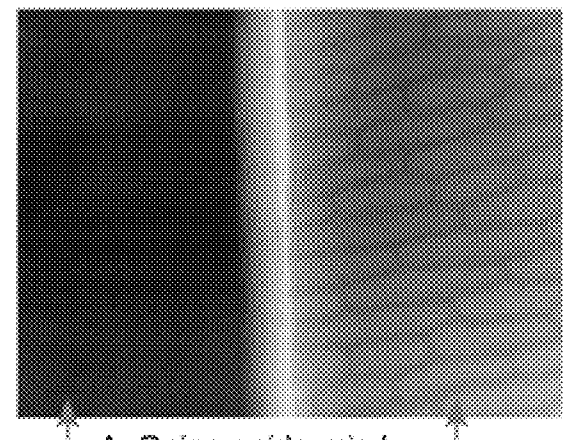

FIGS. 10A-10I demonstrate the focus stacking results acquired by E30 installed on 3D printed microscope. The lens can distinguish the network structure on the house fly labellum (FIG. 10A) but cannot resolve the fine hairs on the honeybee barsitarsus (FIG. 10B). Overall, the miniature microscope equipped with E30 can achieve the desired focus stacking feature for Case I samples (FIG. 10C) but with much reduced details compared with images acquired by AM30 (FIG. 4C). Furthermore, E30 fails to image the fine segments on housebee glossae (FIG. 10D, Case II).

Figure 10I:
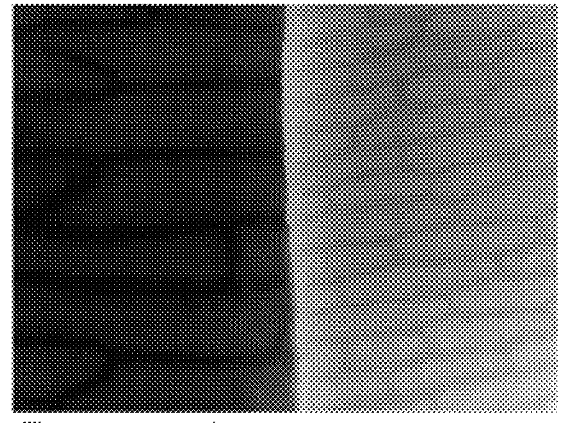

Combined with its poor performance on imaging the fine hairs on honeybee barsitarsus, this leads to failure of reconstructing meaningful focus stacking results for Case II. Finally, E30 shows a reduced contrast of the cell walls in onion epidermis samples (FIGS. 10G-10H) compared with AM30 (FIGS. 4G-4H) and the cell walls shown in FIG. 10I are substantially less distinctive than those in FIG. 4I. The defects in single frames lead to the overall low quality and failure in focus stacking shown FIGS. 10C, 10F and 10I.

Figure 11A:
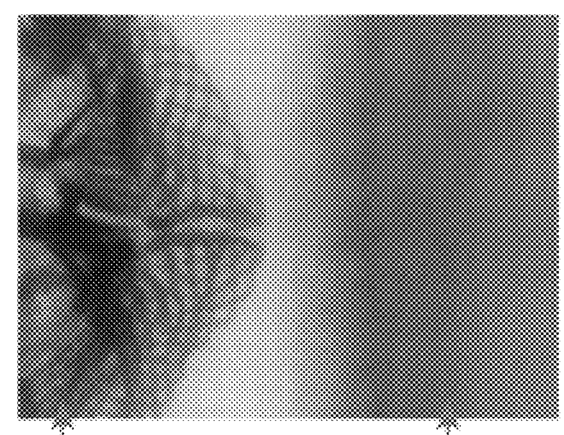
FIGS. 11A-11I: Focus stacking results of 3D printed microscope installed with T30. Case I.
Figure 11B:
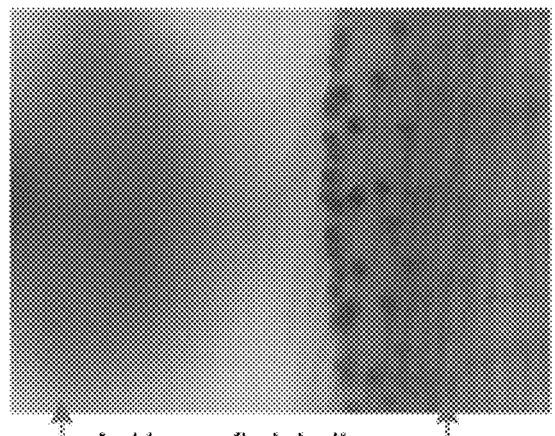
Figure 11C:
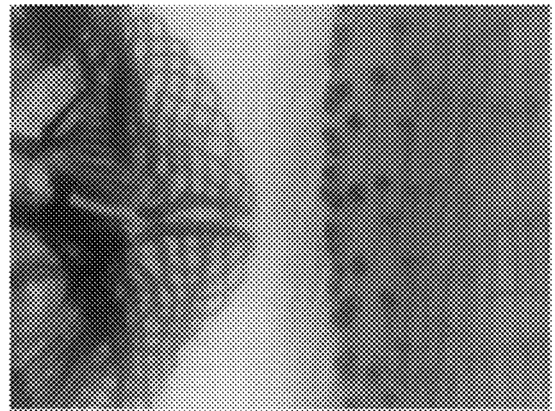
Figure 11D:
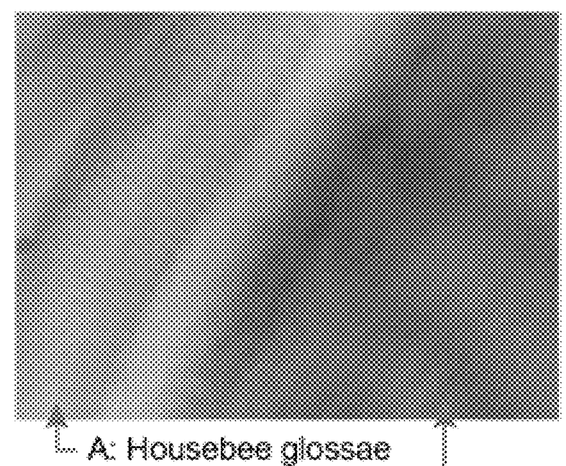
Figure 11E:
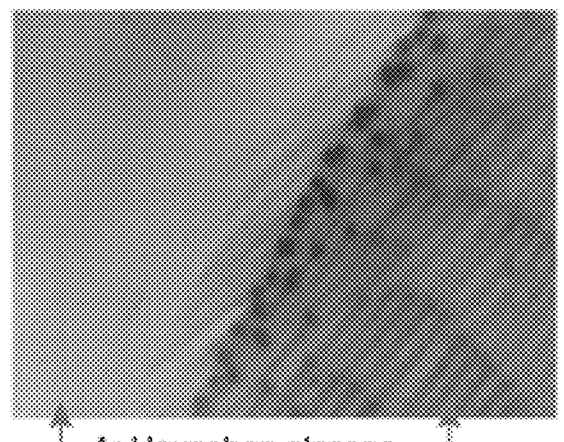
Figure 11F:
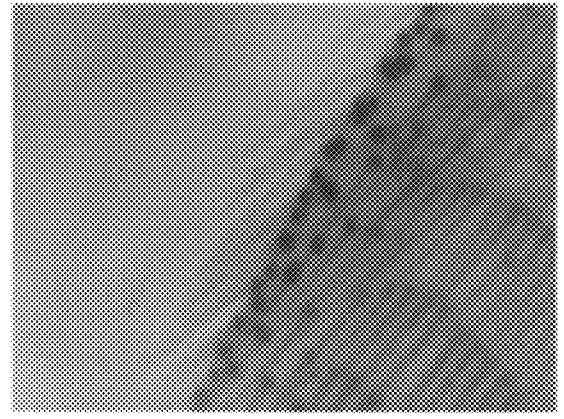
Figure 11G:
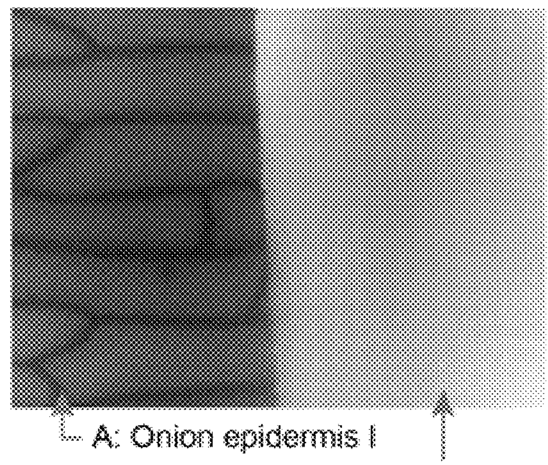
Figure 11H:
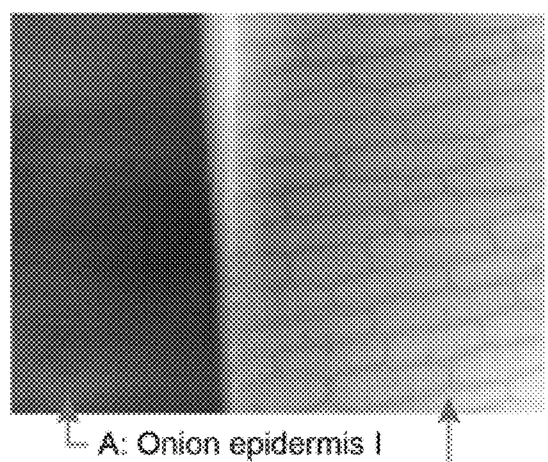
Figure 11I:
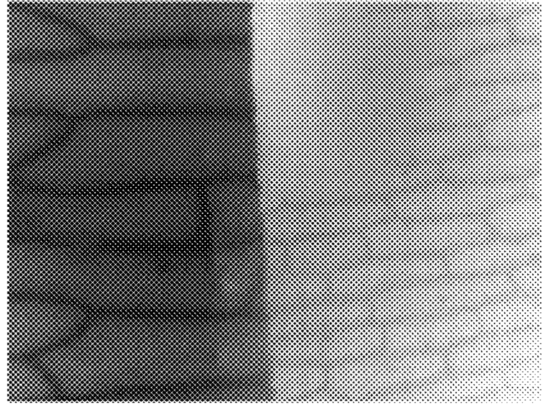

FIGS. 11A-11I present the focus stacking results acquired by T30 installed on 3D printed microscope. The lens can distinguish the network structure on the house fly labellum (FIG. 11A) but show lower resolution for the fine hairs on the honeybee barsitarsus (FIG. 11B). The focus stacked image of Case I from T30 (FIG. 11C) shows a higher contrast than that from E30, but still has lower contrast and less details compared with image acquired by AM30 (FIG. 4C). T30 also fails to image the fine segments on housebee glossae (FIG. 11D). The features of housebee glossae are completely lost in the final focus stacked image (FIG. 11F). Finally, for Case III, the single frames captured by T30 (FIGS. 11G-11H) show lower contrast than the images acquired by AM30 (FIGS. 4G-4H). This directly leads to the failure of focus stacking shown in FIG. 11I, which has a large mistakenly reconstructed area.

9. Manufacturing Cost Estimation of 3D Printed Microscope 9.1 Cost Estimation of Consumable Materials The oxygen permeable membrane and resin will both be consumable in the 3D printing process. The resins for imaging lens and optomechanics follow different recipes introduced in sections 4. Printing Process of Imaging Lens and 6. Printing Process of Optomechanical Components. Their unit prices are 0.339 $/g and 0.34 $/g, respectively. Detailed cost breakdowns are summarized in Table 2 and Table 3. All the 3D printed components are weighed using Excellence XSR Analytical Balance (Mettler Toledo). All the optomechanical components have the total weight of 0.649 g, which corresponds to the resin cost of $0.22. The 3D printed aspherical lens has the weight of 0.024 g, which corresponds to the total resin cost of $0.008.

Both AF2400 Teflon (Biogeneral Inc.) and homemade PDMS membranes are used in this study as the oxygen permeable membrane. The cost for the Teflon membrane is $800/ft for a stripe 3.5 in width, which corresponds to the unit cost of $19 per in2. It is true that the Teflon membrane can be expensive for large area 3D printers, but for our printer with printing area of 1 in. in diameter, the cost to us is marginal. We have carefully designed the resin bath to effectively clamp down and tension the Teflon membrane to maximize its utilization. The Teflon membrane is mechanically strong, and in our daily operation, can last for 3 months or longer. This corresponds to a running cost of $19/90 days/24 hours=$0.009.

For the home-made PDMS membrane, the price of a 500 g PDMS curing kit (Sylgard 184 Elastomer Curing Kit, Dow Inc.) is $286.15, which corresponds to a unit price of $0.57 per gram. To make the estimation safer, let's assume a 10% residual ratio (which is highly overestimated), leading to an updated unit price of $0.64 per gram. Each piece of PDMS film used in our case weighs around 0.06 g and each of them can produce ~60 lenses before being replaced. The cost added to our system from using PDMS membrane for optical components is (0.64 $/g×0.1 g)/60, coming out to $0.0006.

9.2 Cost Estimation of the Capital Equipment

A summary of the cost breakdown of the home-made systems used in this study can be found in Table 4.

The total capital cost is $23,930. It is worthwhile to note that the 6-Dof robot arm is an unnecessarily complex component for this project, but that it happened to be the system available for this study. For the interest of cost reduction, it can be replaced with a linear motorized stage (X-LRT0100AL-AE53C-KX14N, Zaber Inc.) for the cost of $4,534, reducing capital cost down to $14,457. Nevertheless, we will still use the cost of the current system in the following estimation.

Using a moderate estimation, this cost is depreciated over a 10-year period and considered a zero residual value (which incidentally overestimates the cost), resulting in the annual equipment cost of $2,396. The corresponding hourly cost is $2,396/(260 workdays)/(8 hours per workday), which is roughly $1.15. Since the total fabrication time is 45 min. 21 s, then the depreciation cost added to each microscope is $0.87. The cost estimate shown in Table 1 include the cost for consumable materials and the capital equipment appreciation. However, the cost of the man-power is not included in the calculation.

TABLE 2

Cost breakdown of the resin used for fabricating optomechanical components.

| Chemicals | Ratio (wt. %) | Unit Price ($/g) |
|---|---|---|
| HDDA (1,6-Hexanediol Diacrylate) | 97.3 | 0.206 |
| Irgacure 819 | 2.2 | 5.62 |
| Sudan Black I | 0.5 | 3.236 |
| | Total cost: | 0.340 |

TABLE 3

Cost breakdown of the resin used for fabricating optical lenses.

| Chemicals | Ratio (wt. %) | Unit Price ($/g) |
|---|---|---|
| HDDA (1,6-Hexanediol Diacrylate) | 97.3 | 0.206 |
| Irgacure 819 | 2.2 | 5.62 |
| Tinuvin 171 | 0.5 | 2.992 |
| | Total cost: | 0.339 |

TABLE 4

Cost breakdown of the μCLIP 3D printer used in this study

| Components | Model, Manufacturer | Cost |
|---|---|---|
| UV Light Engine | Pro 6600, Wintech Digital Systems Technology Corp. 3860 × 2160 pixels | $6,473 |
| UV projection lens | UV8040BK2, Universe Kogaku America Inc. | $1,350 |
| 6-DoF Robot Arm | Meca500, Mecademic Inc. | $14,040 |
| Resin Bath | Custom CNC | $100 |
| Optomechanical Components | Thorlabs Inc. | $1,000 |
| Computer | Dell | $1,000 |
| | Total cost: | $23,963 |

Figure 12:
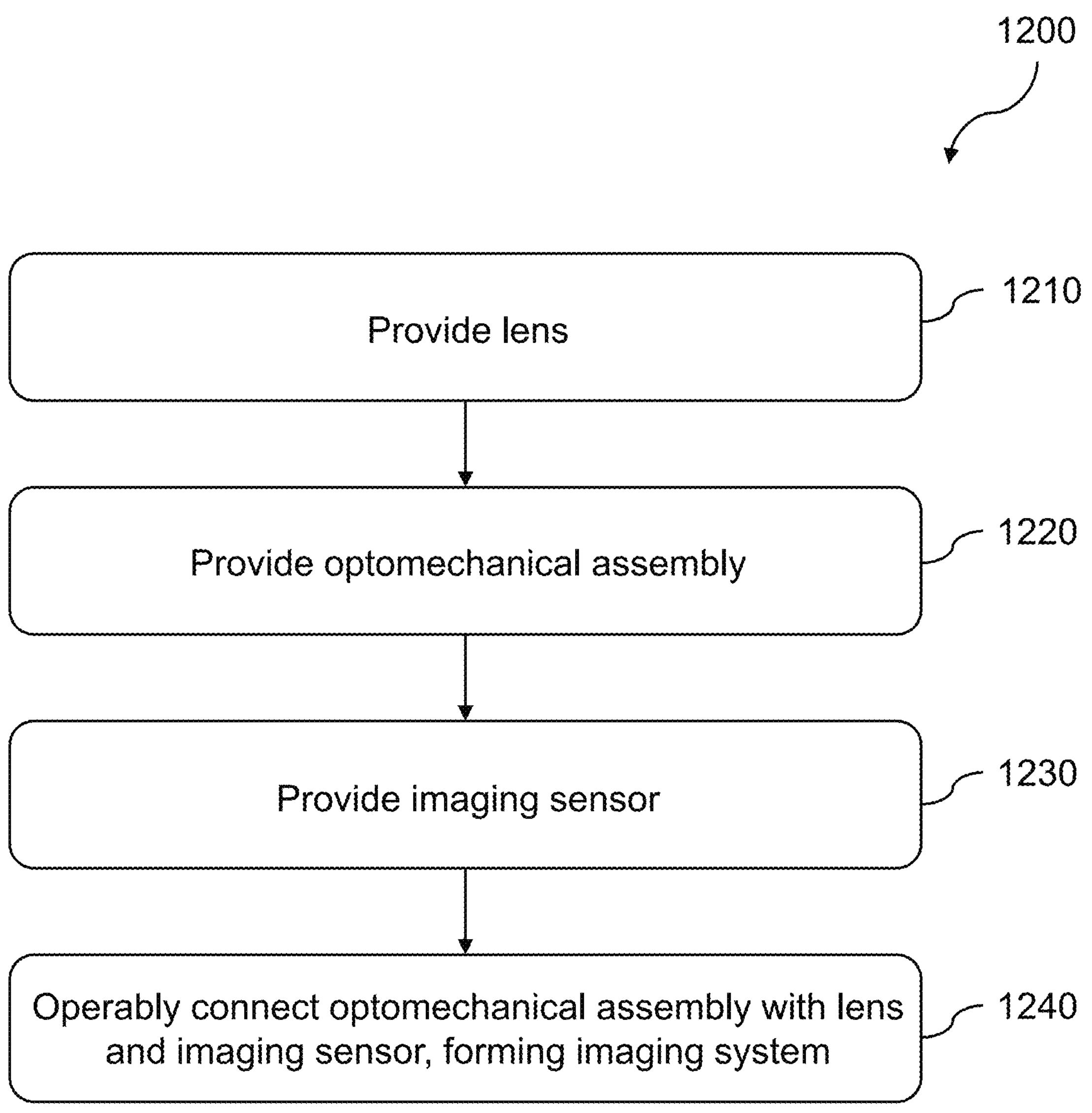
FIG. 12: A flow chart illustrating a method of making an optical imaging system.

FIG. 12 illustrates a flow chart of a method 1200 of making an imaging system. Referring now to FIG. 12, in such a method, a lens is provided (operation 1210). An optomechanical assembly is then provided (operation 1220). In some embodiments, this is accomplished by manufacturing a component of the optomechanical assembly using additive manufacturing. An imaging sensor is then provided (operation 1230). The optomechanical assembly is then operably connected to the lens and the imaging sensor, forming the imaging system (operation 1240).

STATEMENTS REGARDING INCORPORATION BY REFERENCE AND VARIATIONS

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a large number of variations of the devices, device components, methods steps set forth in the present description. As will be obvious to one of skill in the art, methods and devices useful for the present methods can include a large number of optional composition and processing elements and steps.

As used herein and in the appended claims, the singular forms “a”, “an”, and “the” include plural reference unless the context clearly dictates otherwise. Thus, for example, reference to “a cell” includes a plurality of such cells and equivalents thereof known to those skilled in the art. As well, the terms “a” (or “an”), “one or more” and “at least one” can be used interchangeably herein. It is also to be noted that the terms “comprising”, “including”, and “having” can be used interchangeably. The expression “of any of claims XX-YY” (wherein XX and YY refer to claim numbers) is intended to provide a multiple dependent claim in the alternative form, and in some embodiments is interchangeable with the expression “as in any one of claims XX-YY.”

Every device, system, combination of components, or method described or exemplified herein can be used to practice the invention, unless otherwise stated.

Whenever a range is given in the specification, for example, a temperature range, a time range, or a composition or concentration range, all intermediate ranges and subranges, as well as all individual values included in the ranges given are intended to be included in the disclosure. It will be understood that any subranges or individual values in a range or subrange that are included in the description herein can be excluded from the claims herein.

All patents and publications mentioned in the specification are indicative of the levels of skill of those skilled in the art to which the invention pertains. References cited herein are incorporated by reference herein in their entirety to indicate the state of the art as of their publication or filing date and it is intended that this information can be employed herein, if needed, to exclude specific embodiments that are in the prior art. For example, when composition of matter are claimed, it should be understood that compounds known and available in the art prior to Applicant's invention, including compounds for which an enabling disclosure is provided in the references cited herein, are not intended to be included in the composition of matter claims herein.

As used herein, “comprising” is synonymous with “including,” “containing,” or “characterized by,” and is inclusive or open-ended and does not exclude additional, unrecited elements or method steps. As used herein, “consisting of” excludes any element, step, or ingredient not specified in the claim element. As used herein, “consisting essentially of” does not exclude materials or steps that do not materially affect the basic and novel characteristics of the claim. In each instance herein any of the terms “comprising”, “consisting essentially of” and “consisting of” may be replaced with either of the other two terms. The invention illustratively described herein suitably may be practiced in the absence of any element or elements, limitation or limitations which is not specifically disclosed herein.

As used herein, “about” means within an acceptable error range for the particular value as determined by one of ordinary skill in the art, which is part of how the value is measured or determined, i.e., the limits of the measurement system. Unless explicitly stated otherwise in the Examples, Aspects, or elsewhere herein in connection with a particular assay, result or embodiment, “about” means within one standard deviation or at most according to practice in the art or within a range of 5%, whichever is greater.

One of ordinary skill in the art will appreciate that starting materials, biological materials, reagents, synthetic methods, purification methods, analytical methods, assay methods, and biological methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

We claim:

1. A method of making an imaging system, the method comprising:
- providing a lens;
- providing an optomechanical assembly, wherein providing the optomechanical assembly comprises manufacturing a component of the optomechanical assembly using additive manufacturing;
- providing an imaging sensor; and
- operably connecting the optomechanical assembly with said lens and said imaging sensor, forming said imaging system;

wherein the optomechanical assembly comprises an actuator; and wherein providing the optomechanical assembly comprises manufacturing the actuator using additive manufacturing.

2. The method of claim 1, wherein providing the optomechanical assembly comprises manufacturing the component of the optomechanical assembly using micro-continuous liquid interface production (μCLIP) 3D printing.

3. The method of claim 2, wherein each component of the optomechanical assembly comprises two or more functions selected from the group consisting of: system structural frame, mechanical mount for the lens, mechanical mount for the imaging sensor, optical enclosure to block stray light, elastic structure, and mechanical mounts for actuating elements as part of the actuator.

4. The method of claim 2, wherein each component of the optomechanical assembly comprises passive alignment features, allowing for assembly of the imaging system without assembly machinery or an assembly platform.

5. The method of claim 2, wherein the imaging system is discarded after a single use.

6. The method of claim 2, wherein each component of the optomechanical assembly comprises a design that can be customized based upon at least one of a field of view of the lens, a magnification of the lens, a working distance of the imaging system, and a resolution of the imaging sensor, and is manufactured using additive manufacturing.

7. The method of claim 1, wherein providing the lens comprises manufacturing the lens using additive manufacturing.

8. The method of claim 7, wherein providing the lens comprises manufacturing the lens using micro-continuous liquid interface production (μCLIP) 3D printing.

9. The method of claim 7, wherein the lens is manufactured using a photo-curable resin or photopolymer, wherein the photo-curable resin or photopolymer comprises a monomer and a photoinitiator;
- wherein the monomer is selected from the group consisting of: 1,6-hexanediol diacrylate, 2-hydroxyethyl methacrylate, polyethylene glycol diacrylate, trimethylolpropane triacrylate, urethane dimethacrylate, triethylene glycol dimethacrylate, bisphenyl A-glycidyl methacrylate, bisphenol A ethoxylate diacrylate, another meth(acrylate) monomer, another meth(acrylate) oligomer, trimethylolpropane tris(3-mercaptopropionate), pentaerythritol tetra(3-mercaptopropionate), tris[2-(3-mercaptopropionyloxy) ethyl] isocyanurate, pentaerythritol tetrakis (3-mercaptopropionate), another thiol monomer, 1,4-butandiol dipent-4-yn-2-yl carbonate, 2,2-bis [4-(2-hydroxy)ethoxyphenyl]propane dibut-3-yn-1-yl carbonate, and tricyclo[5.2.1.0] decane-4,8-dimethanol dibut-3-yn-1-yl carbonate;
- wherein the photoinitiator is selected from the group consisting of: bis(2,4,6,-trimethylbenzoyl) phenylphosphine oxide, benzophenone, 2-hydroxy-2-methyl-1-phenyl-propan-1-one, 2-hydroxy-4'-(2-hydrooxyethoxy)-2-methylpropiophenone, 2,2'-azobis [2-methyl-n-(2-hydroxyethyl) propionamide], 2,2-dimethoxy-2-phenylacetophenone, diphenyl (2,4,6-trimethylbenzoyl) phosphine oxide, lithium phenyl(2,4,6,-trimethylbenzoyl)phosphate, ethyl (2,4,6-trimethylbenzoyl) phenylphosphinate, camphorquinone, bis(4-methoxybenzoyl) diethylgermanium, 5-amino-2-benzyl-1H-benzo[de]isoquinoline-1,3(2H)-dione, zinc tetraphenylporphyrin, 3-nitro-9-octyl-9H-carbazole, 2,6-bis (triphenylamine) dithieno[3,2-b: 2',3'-d] phosphole oxide, 3-hydroxyflavone, tris (2,2-bipyridyl) dichlororuthenium (II) hexahydrate (Ru), and eosin Y; and
- wherein the photo-curable resin or photopolymer further comprises a light absorbing material, and
- wherein the light absorbing material is selected from the group consisting of: 2-(2-hydroxy-5-methylphenyl) benzotriazole, Sudan Black B, 2-(2H-benzotriazol-2-yl)-4,6-bis(1-methyl-1-phenylethyl)phenol, 2-nitrophenyl phenyl sulfide, martius yellow, octocrylene, avobenzone, 2,5-bis(5-tert-butyl-benzoxazol-2-yl)thiophene, disodium 4,4'-bis (2-sulfonatostyryl)biphenyl, benzenepropanoic acid, 2,3,6,7-tetrahydro-9-methyl-1H,5H-quinolizino(9,1-gh)coumarin, morin hydrate, nitrofurazone, 5,12-naphthacenequinone, phenazine, 1,4-bis-(2-(5-phenyloxazolyl))-benzene, quinolone yellow, 3,3',4',5,6-pentahydroxyflavone, salicylaldehyde, Sudan I, triamterene, UV386A, and 9,10-diethoxyanthracene.

10. The method of claim 1, wherein providing the optomechanical assembly comprises manufacturing the actuator using micro-continuous liquid interface production (μCLIP) 3D printing.

11. The method of claim 1, wherein the actuator comprises a lens focusing module; and wherein providing the optomechanical assembly comprises manufacturing the lens focusing module using additive manufacturing.

12. The method of claim 11, wherein providing the optomechanical assembly comprises manufacturing the lens focusing module using micro-continuous liquid interface production (μCLIP) 3D printing.

13. The method of claim 1, wherein the optomechanical assembly comprises a passive alignment feature, an elastic component, and an immobilizing component.

14. The method of claim 1, wherein the optomechanical assembly is configured to move the lens thereby altering a distance between the lens and the imaging sensor.

15. The method of claim 1, wherein the optomechanical assembly comprises:
- a clamshell; and
- a front cap;

wherein the actuator comprises an elastic lens mount; and wherein providing the optomechanical assembly comprises manufacturing at least one of the clamshell, the front cap, and the elastic lens mount using additive manufacturing.

16. The method of claim 15, wherein providing the optomechanical assembly comprises manufacturing at least one of the clamshell, the front cap, and the elastic lens mount using micro-continuous liquid interface production (μCLIP) 3D printing.

17. The method of claim 15, wherein:

at least one of the clamshell, the front cap, and the elastic lens mount comprises at least two of the group consisting of: a passive alignment feature, an elastic component, and an immobilizing component; and wherein the clamshell comprises a passive alignment feature, the front cap comprises a passive alignment feature, the elastic lens mount comprises an elastic component, or the front cap comprises an immobilizing component.

18. The method of claim 15, wherein the actuator is configured to move the lens thereby altering a distance between the lens and the imaging sensor.

19. The method of claim 1, wherein the imaging system comprises a linear dimension that is less than or equal to about 30 cm.

20. The method of claim 1, wherein the imaging system comprises a linear dimension that is less than or equal to about 1 mm.

21. The method of claim 1, wherein the imaging sensor comprises a photodetector, wherein the photodetector comprises a complementary metal-oxide-semiconductor (CMOS) sensor, a charge-coupled device (CCD) sensor, or another image sensing device.

22. A method of making an imaging system, the method comprising:

providing a lens;

providing an optomechanical assembly, wherein providing the optomechanical assembly comprises manufacturing a component of the optomechanical assembly using additive manufacturing;

providing an imaging sensor; and operably connecting the optomechanical assembly with said lens and said imaging sensor, forming said imaging system;

wherein the optomechanical assembly comprises an actuator; and wherein providing the optomechanical assembly comprises manufacturing the actuator using additive manufacturing;

wherein providing the optomechanical assembly comprises manufacturing a component of the optomechanical assembly using micro-continuous liquid interface production (μCLIP) 3D printing; and wherein each component of the optomechanical assembly comprises passive alignment features, allowing for assembly of the imaging system without assembly machinery or an assembly platform.

23. A method of making an imaging system, the method comprising:

providing a lens;

providing an optomechanical assembly, wherein providing the optomechanical assembly comprises manufacturing a component of the optomechanical assembly using additive manufacturing;

providing an imaging sensor; and operably connecting the optomechanical assembly with said lens and said imaging sensor, forming said imaging system;

wherein the optomechanical assembly comprises an actuator; and wherein providing the optomechanical assembly comprises manufacturing the actuator using additive manufacturing;

wherein the optomechanical assembly comprises:

a clamshell; and a front cap;

wherein the actuator comprises an elastic lens mount; and wherein providing the optomechanical assembly comprises manufacturing at least one of the clamshell, the front cap, and the elastic lens mount using additive manufacturing.

* * * * *